US009161238B2

(12) United States Patent
Reed et al.

(10) Patent No.: US 9,161,238 B2
(45) Date of Patent: Oct. 13, 2015

(54) MOBILE DEVICE MONITORING AND TESTING

(71) Applicant: Mobile Experience Solutions, Inc., Renton, WA (US)

(72) Inventors: David K. Reed, Sammamish, WA (US); Jay R. Uusitalo, Redmond, WA (US); Mark Knasiak, Renton, WA (US); Philip E. Brown, Redmond, WA (US)

(73) Assignee: MOBILE EXPERIENCE SOLUTIONS, INC., Renton, WA (US)

( * ) Notice: Subject to any disclaimer, the term of this patent is extended or adjusted under 35 U.S.C. 154(b) by 208 days.

(21) Appl. No.: 13/785,957

(22) Filed: Mar. 5, 2013

(65) Prior Publication Data
US 2013/0273853 A1  Oct. 17, 2013

Related U.S. Application Data

(60) Provisional application No. 61/624,675, filed on Apr. 16, 2012.

(51) Int. Cl.
*H04B 17/00* (2015.01)
*H04W 24/00* (2009.01)
*H04W 24/08* (2009.01)

(52) U.S. Cl.
CPC .............. *H04W 24/00* (2013.01); *H04W 24/08* (2013.01)

(58) Field of Classification Search
CPC ...... H04W 4/00; H04W 4/16; G06F 11/2294; G06F 3/0227; G06F 3/0488; G06F 7/00; G06Q 20/3278; G06Q 30/0267; H04L 43/50; H04M 1/24; H04M 2250/02; H04M 15/93; H04M 2250/22

USPC ................... 455/67.11, 67.12, 67.7, 423, 425
See application file for complete search history.

(56) References Cited

U.S. PATENT DOCUMENTS

| 4,765,276 | A  | * | 8/1988 | Kime ................................ 54/71 |
| 7,545,386 | B2 |   | 6/2009 | Marsyla et al. |
| 7,751,813 | B2 | * | 7/2010 | Varanda ........................ 455/423 |
| 7,881,491 | B2 |   | 2/2011 | Mizrachi |
| 8,014,995 | B2 |   | 9/2011 | Marsyla et al. |
| 2002/0126207 | A1 | * | 9/2002 | Brodigan ...................... 348/180 |
| 2008/0064340 | A1 | * | 3/2008 | Whatmough et al. ...... 455/67.11 |
| 2008/0139195 | A1 | * | 6/2008 | Marsyla et al. ............... 455/423 |
| 2009/0180451 | A1 | * | 7/2009 | Alpert et al. .................. 370/338 |
| 2012/0198279 | A1 | * | 8/2012 | Schroeder ....................... 714/32 |

FOREIGN PATENT DOCUMENTS

WO  2011/156116 A2  12/2011

* cited by examiner

*Primary Examiner* — Edward Urban
*Assistant Examiner* — Max Mathew
(74) *Attorney, Agent, or Firm* — Seed IP Law Group PLLC

(57) ABSTRACT

A multi-channel communications interface is provided and communicatively coupled to a controller which captures, via the communications interface, video data of a display of a mobile device at a resolution and frame rate equal to or greater than that of the mobile device display, and may additionally capture various other outputs of the mobile device. During the capture of the video data and other outputs, one or more input actions may be provided to the mobile device by the controller via the communications interface. The input actions may be provided in an interactive or automated manner, and may correspond to interactions of users with the controller that are performed using one or more provided graphical or programmatic interfaces.

45 Claims, 7 Drawing Sheets

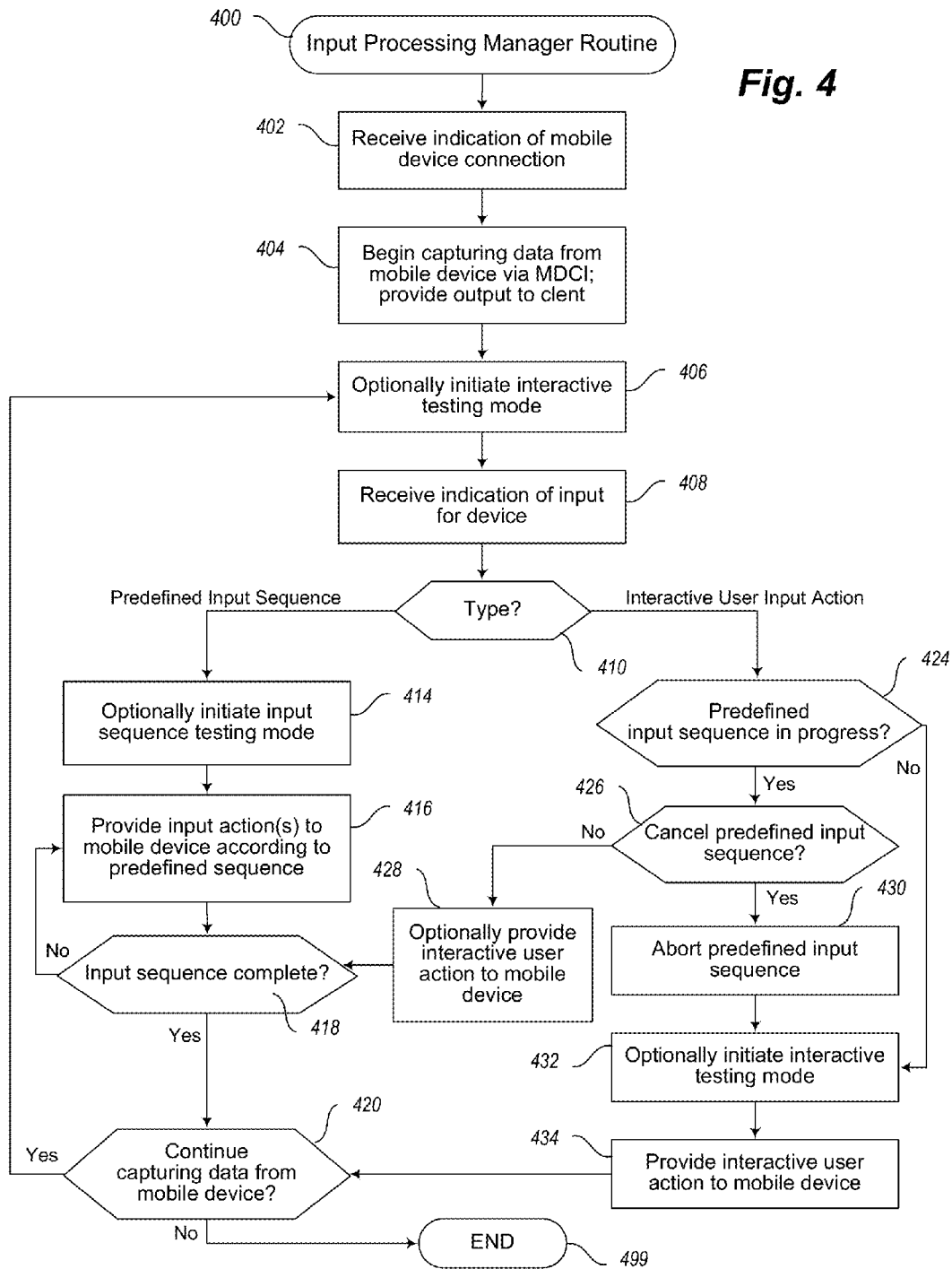

MOBILE DEVICE MONITORING AND TESTING

BACKGROUND

1. Field

This disclosure generally relates to automated or interactive monitoring and testing of wireless communications based mobile devices (hereinafter mobile devices), and more particularly to local and remote capturing and stimulation of mobile device output.

2. Description of the Related Art

Hardware manufactures or designers are releasing new mobile devices at a faster rate, with higher complexity, and with a wider variety of functionality across the mobile device offerings. Wireless communications service providers or carriers and data service providers (e.g., cellular communications service providers or carriers) typically provide a variety of mobile devices or services related to such mobile devices (e.g., smart phones) in a variety of locations, conditions and environments. Such variety, coupled with the increasing complexity and variety of mobile devices and the expanding input and output capabilities of such mobile devices, may lead to unforeseen or even undesirable behavior. Enabling hardware manufacturers and/or service providers (collectively, "clients") to locally or remotely monitor and interactively test mobile devices may provide those clients with opportunities to identify and reproduce such behavior, for instance aberrant behavior.

As one example, suppose that a client (e.g., mobile device manufacturer or designer or wireless communications service provider) has received multiple complaints from end users of particular mobile devices provided by the client. These complaints may be related to undesirable behavior in the form of audio interference produced by the mobile device when using a particular application on the mobile device. Such complaints may have been provided by end users of a variety of different mobile devices under a variety of circumstances, such as by end users of multiple models of the device provider's mobile devices using one or more versions of a particular operating system. The undesirable behavior may be difficult to intentionally reproduce, let alone do so in a manner that allows the client or other interested entity to determine a cause of the undesirable behavior. Capturing all output of one or more representative mobile devices, while monitoring user input to the devices or even reproducing user-reported actions to attempt to reproduce the undesirable behavior, may be useful to a number of different entities—to the mobile device manufacturer or designer; to a wireless service provider of the end user; to a provider of the application that is reportedly in use when the undesirable audio interference occurs; to end users of the mobile device; or other entity. Additionally, the ability to remotely perform such monitored interactions with the mobile device may provide improved results, by allowing those results to be obtained for multiple mobile devices in a variety of locations, conditions and environments (such as those that may resemble those in which the undesirable behavior was observed) while allowing a client interested in such results to remain in a single preferred location.

As another example, an application developer interested in releasing an application for use with a particular mobile device or multiple such mobile devices may find that testing the application on a large number of mobile devices in a thorough manner requires significant resources, such as an investment in acquiring the multiple mobile devices and a substantial amount of human labor and time to interact with the application on each of those multiple mobile devices. Furthermore, without being enabled to monitor and/or capture each of the multiple input and output capabilities of each mobile device on which the application is being tested, the developer may be unable to determine particular aspects of the mobile device and its operations with respect to the tested application. For such purposes and others, it may be useful to provide a mobile device with a predefined sequence of input actions in order to examine the resulting output of that mobile device (for example, to ensure that such output matches the behavior desired and/or expected by the application developer). In certain circumstances, providing interactive user actions to a monitored mobile device, either independently or in conjunction with one or more predefined sequences of input actions, may allow an application developer or other interested entity to gain insight into mobile device behavior that would otherwise be more difficult to obtain.

New approaches are therefore desirable that automate various activities related to the monitoring of mobile devices while allowing for simultaneous local or remote operation and the use of predefined input sequences, partially predefined input sequences and/or interactive testing.

BRIEF SUMMARY

Various systems, methods and algorithms are described herein to automate various activities related to the monitoring of mobile devices. In certain embodiments, local or remote clients may interact with one or more mobile devices monitored according to the described systems and methods, as well as defining and initiating the providing of various predefined input sequences to such mobile devices, while simultaneously capturing the display output and other output of each monitored mobile device.

In at least some embodiments, a Mobile Device Communications Interface ("MDCI") is provided that may be communicatively coupled to a mobile device in order to enable, in conjunction with a provided Communications Interface Controller ("CIC") system, the monitoring and capture of one or more output capabilities of the mobile device. In at least some embodiments, the monitoring and capture of such output capabilities include capturing a display output of the mobile device at a resolution and frame rate equal to or greater than the resolution and frame rate provided by the mobile device display. The captured display output may be provided, in some embodiments, to a transcoding module included in the MDCI or the CIC system in order to transcode the captured video data to one of several high-definition ("HD") video formats. In this manner, HD video output of the mobile device display may be stored in one or more storage devices included in or communicatively coupled to the CIC system, and may, in certain embodiments, be provided to one or more client users of the CIC system. In at least some embodiments, the CIC system is coupled directly to the MDCI, which is in turn coupled to a monitored mobile device. In other embodiments, the CIC system may be located remotely from the MDCI and monitored mobile device, such as if the CIC system is communicatively coupled to the MDCI via one or more communication networks and/or computing networks.

In addition to capturing one or more output capabilities of the monitored mobile device, in at least some embodiments the CIC system may provide the mobile device with input actions via the MDCI using one or more input capabilities of the monitored mobile device. Such input actions may include one or more defined input sequences and/or interactive input actions from a local or remote client of the CIC system, and may in certain embodiments take the form of "scripts" that may include multiple defined input sequences, as well as defined triggers or other statements to initiate such input sequences in various manners. In certain embodiments, interactive input actions may be provided by a local or remote client of the CIC system using a Graphical User Interface ("GUI") provided by the CIC system or entity operating the CIC system, such as a Mobile Device Testing Service. In certain embodiments, interactive input actions may be provided by a local or remote client of the CIC system via one or more programmatic interfaces provided by the CIC system or Mobile Device Testing Service, such as by using an interactive command-line interface. In at least some embodiments, clients may also use a provided GUI of the CIC system to record or otherwise define one or more input sequences for the CIC system to provide to one or more monitored mobile devices. Similarly, in an embodiment, clients of the CIC system or associated Mobile Device Testing Service may use a provided programmatic interface of the CIC system (such as an Application Programming Interface, or "API") to create or otherwise define predefined input sequences for the CIC system to provide to one or more monitored mobile devices.

In certain embodiments, the MDCI may be communicatively coupled to a monitored mobile device via multiple channels of the MDCI in a manner that enables the capture of and interaction with a plurality of input/output ("I/O") and other capabilities of the monitored mobile device by the CIC system. For example, in at least certain embodiments, one or more audio inputs and outputs of the mobile device may be captured and/or used to replicate or otherwise provide user audio input. Other input/output capabilities of the monitored mobile device may be coupled to the CIC system via the MDCI, as is described in greater detail elsewhere. Furthermore, also as described in greater detail elsewhere herein, the CIC system may provide a variety of input and output processing related to I/O channels and other channels of the MDCI corresponding to I/O and other capabilities of a monitored mobile device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4 is a flow diagram of an example embodiment of an Input Processing Manager routine.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, networks including packet switching networks or cellular networks and related infrastructure (e.g., base stations, home resource locator system, visitor resource locator system, SS7 systems) as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

System Overview

Figure 1:
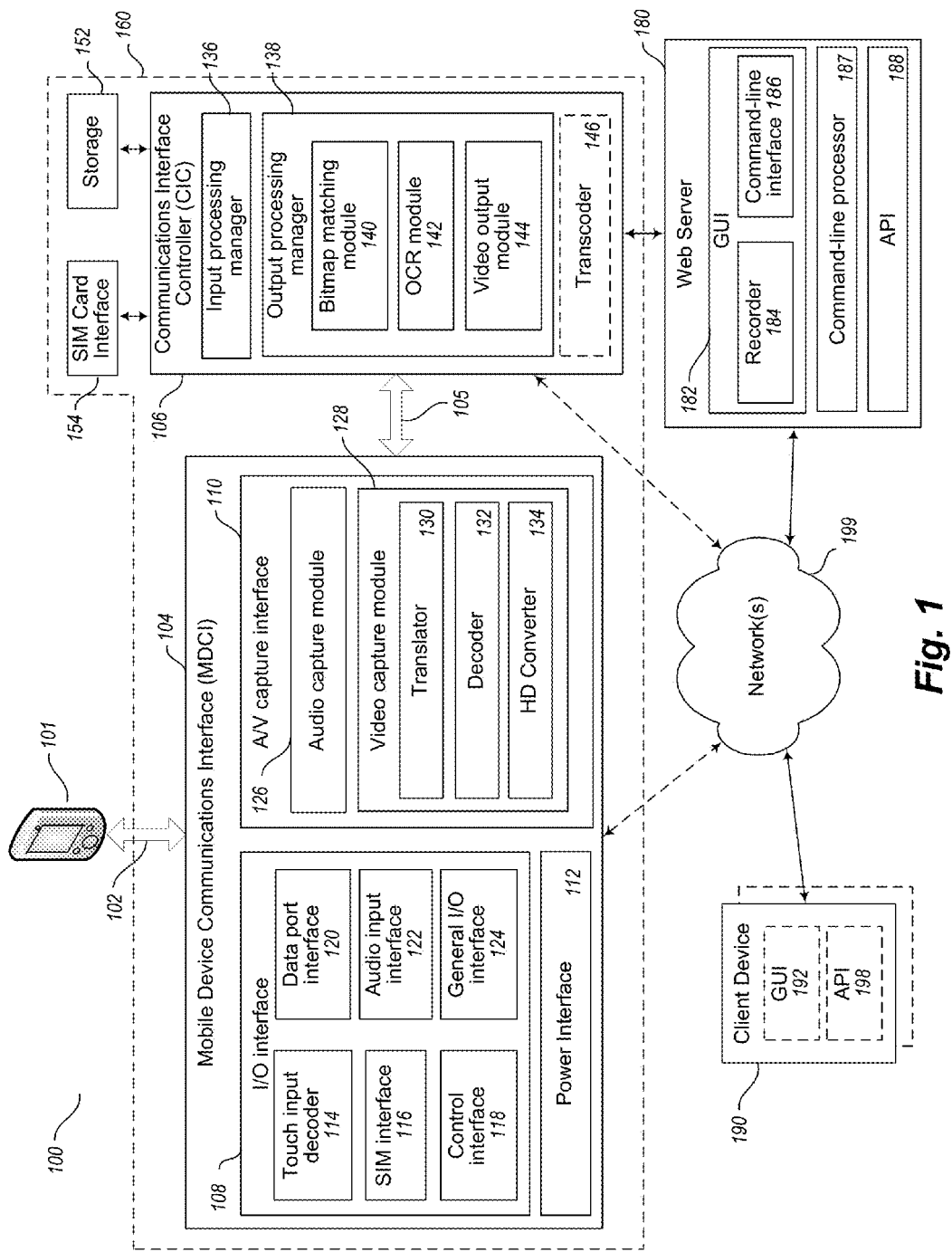
FIG. 1 is a schematic diagram of a networked environment, including a Mobile Device Communications Interface (communicatively coupled to a mobile device), a Communications Interface Controller, one or more client devices, and a Web server operated by a Mobile Device Testing Service (not shown).

FIG. 1 shows an environment 100 including a monitored mobile device 101 communicatively coupled to a Mobile Device Communications Interface (MDCI) 104 via communication links 102.

The MDCI 104 is communicatively coupled to a Communications Interface Controller (CIC) 106 via communication links 105. The depicted environment 100 additionally includes a Web server 180 provided by a Mobile Device Testing Service (not shown) that provides access for one or more client devices 190 via various other servers and public and/or private networks 199 (e.g., the Internet).

The monitored mobile device 101 may be, as a non-exclusive list of examples, a portable email device, personal digital assistant, cell phone, smart phone, satellite phone, palmtop computing device, laptop, tablet computing device, game console, media player or other device with wireless communications capabilities and that includes or combines capabilities of any or all of these. In the illustrated embodiment, MDCI 104 and CIC 106 are depicted separately.

In certain embodiments, MDCI 104 and CIC 106 may be combined into a single Mobile Device Monitoring System 160, which may additionally and optionally include one or more storage modules 152 and a SIM card interface 154 to communicatively interface with one or more subscriber identity modules or similar unique subscriber identity storage media (generically SIM or SIMs). In at least one embodiment, Mobile Device Monitoring System 160 may include an MDCI and CIC while being communicatively coupled to either or both of an external SIM card interface and one or more external storage devices. In the depicted embodiment, communication links 105 include physical connections, such that MDCI 104 and CIC 106 are located within a same geographical location; in other embodiments, the CIC may be located remotely from the MDCI, such that communication links 105 include one or more network connections. Furthermore, in at least one embodiment, the CIC 106 may be communicatively coupled to multiple monitored mobile devices via a corresponding number of Mobile Device Communications Interfaces.

Communication links 102 comprise a plurality of electrical interfaces designed to sense or induce particular electrical, magnetic, electromagnetic and/or mechanical operations of the monitored mobile device 101. Such interfaces may include probes, wires, optical and/or magnetic sensors, actuators and transducers communicatively coupled to the mobile device. These may provide traces and connections to, as non-exclusive examples: one or more video displays of the mobile device; one or more other visual outputs of the device (e.g., LED or other visual indicators); one or more touch-based interfaces of the mobile device (e.g., a touchscreen display); one or more buttons or other actuators located on the mobile device (e.g., a keyboard, keypad, trackball, etc.); one or more audio outputs of the mobile device; one or more audio inputs of the mobile device (e.g., microphones); one or more optical inputs of the mobile device (e.g., one or more front- or rear-facing cameras); one or more radio frequency interfaces and connections of the mobile device; one or more power interfaces of the mobile device (e.g., battery connection, power connection, etc.); one or more SIM card interfaces of the mobile device; and one or more data ports of the mobile device (e.g., a USB, micro-USB, mini-USB, PCI, PCIe, DisplayPort, Thunderbolt, Lightning, or other standard or proprietary data port); etc. In certain embodiments, communication links 102 further include additional circuit logic, communicatively coupled to one or more of the electrical interfaces described above, for translating signals passed via such electrical interfaces into data usable by the MDCI 104 and/or the CIC 106. Such translation may include converting an electrical voltage or current level to another electrical voltage or current level, converting mechanical, magnetic or optical signals into electrical signals, or converting electrical signals into one or more mechanical, magnetic or optical signals. In at least some embodiments, communication links 102 provide distinct channels for separate and simultaneous use by various components of the MDCI 104. For example, separate channels of the MDCI 104 may be provided via communication links 102 for audio output data, audio input data, and display output data, as well as one or more distinct other channels for various I/O functionality.

In the depicted embodiment, the MDCI 104 includes an I/O interface 108, audio/video ("A/V") capture interface 110, and power interface 112. The I/O interface 108 includes a number of modules to effectuate interactions with the monitored mobile device 101 via communication links 102. In particular, I/O interface 108 includes a touch input decoder 114 to receive, decode and/or provide signals that correspond to a touchscreen or other touch-sensitive display of the monitored mobile device 101; a SIM interface 116 to send and receive signals associated with a SIM interface of the mobile device; a control interface 118 to send and receive signals associated with one or more actuator controls of the mobile device (such as a physical keyboard, power or volume actuator controls, trackball, or other physical actuator controls of the device); a data port interface 120 for providing or receiving data corresponding to a data port of the mobile device; an audio input interface 122 for providing audio data to the mobile device, such as may correspond to a microphone input; and general I/O interface 124 to provide other input actions and/or receive other output of the mobile device. The power interface 112 enables the CIC 106 to provide and control electrical power to the monitored mobile device 101 via MDCI 104. In at least some embodiments, the power interface 112 allows the CIC 106 to send and receive control signals related to the electrical supply of the monitored mobile device 101, such as an indication that the mobile device has been connected or disconnected from an external power supply; an indication of a power level of a battery of the mobile device, an indication that a battery of the mobile device has been inserted or removed; or other indication related to power provided to the mobile device.

The A/V capture interface 110 includes an audio capture module 126 for capturing audio output streams of the monitored mobile device 101 (such as may be produced by an internal or external speaker of the device) and video capture module 128 for capturing display information from the monitored mobile device. The video capture module 128 includes a translator module 130, a decoder module 132, and an HD converter module 134. The translator module 130 receives the electrical signals from a display of the monitored mobile device 101 via communication links 102 and translates the received signals to a decodable format. For example, a primary display of the monitored mobile device 101 may typically be driven based on low-voltage differential signaling (LVDS), current-mode logic (CML), single-ended signaling or other known method. Translator module 130 converts the electrical signals associated with such methods to a specific format for the purpose of passing the received data from such signals to decoder module 132. As an example, in certain embodiments translator module 130 may convert the LVDS electrical signals sent to the primary display of monitored mobile device 101 into data compatible with a Mobile Display Digital Interface (MDDI), Mobile Industry Processor Interface (MIPI), Flatlink, Displayport, or other standard or proprietary interface. Decoder module 132 receives this compatible data from translator module 130 and decodes the received data to extract readable frame information. In at least some embodiments, the decoder module 132 extracts and buffers frame information at regular predetermined intervals, such as may enable buffering a single complete frame of display data 60 times per second (60 Hz). The buffered frame data is provided to HD converter module 134, which then generates a full high-definition video stream for output to the Communications Interface Controller 106. In at least the depicted embodiment, the audio information captured by audio capture module 126 is provided to HD converter module 134 to be synchronized and included in the video stream provided to the CIC 106. In other embodiments, such audio information may be provided to the CIC 106 separately, or in a user-selectable manner determined by the CIC. In at least some embodiments, the CIC may store some or all of the captured video provided by the A/V capture interface of the MDCI in one or more storage devices communicatively coupled to the CIC, such as storage 152 in the environment depicted by FIG. 1.

In the depicted embodiment, the CIC 106 includes an input processing manager 136, an output processing manager 138, and transcoding module 146. The input processing manager 136 receives a variety of input actions (such as may be provided in certain embodiments via Web server 180 or client devices 190) and relays those received input actions to appropriate modules of the I/O interface 108 of MDCI 104 via communication links 105. For example, input processing manager 136 may receive one or more input actions associated with a touch command for a touch-based display of the monitored mobile device 101, such as may be used in a Graphical User Interface provided by Web server 180 to one or more clients, as described in greater detail elsewhere herein. Responsive to receiving one or more indications of such input actions, the input processing manager 136 determines that the indicated input actions are intended for the touch-based display of the monitored mobile device 101, and provides information specific to such input actions to touch input decoder 114, which in turn provides signals corresponding to those input actions to monitored mobile device 101 via communication links 102. In this manner, client actions performed using user-selectable controls of a provided GUI or other interface may, in at least some embodiments, be provided to monitored mobile device 101 as if a user of the monitored mobile device physically performed such input actions using the monitored mobile device directly. Furthermore, since in at least some embodiments input processing manager 136 utilizes channels of the MDCI 104 that are distinct from those utilized by video capture module 128, and since I/O interface 108 utilizes channels the MDCI that are distinct from those utilized by video capture module 128, indications of input actions relayed to or received from the I/O interface 108 by input processing manager 136 are provided while the NV capture interface 110 concurrently captures video display data from the monitored mobile device 101.

In certain embodiments, the input processing manager 136 may additionally include one or more command processing engines (not shown) to provide various command processing functionality. For example, as is described in greater detail elsewhere herein, individual input actions or predefined input sequences may be provided to the CIC 106, and in various embodiments may be provided in various manners including, but not limited to one or more GUIs provided for use with the CIC; one or more programmatic interfaces (e.g., an API or other programmatic interface, as may be provided by various libraries, class interfaces and/or network service protocols such as via Web services) provided for use with the CIC; XML or other markup-based languages; one or more interpreted languages (e.g., Perl, Python, Ruby, etc.); one or more compiled languages (e.g., C++, .NET, Java, etc.); one or more scripting or macro languages; etc. The input processing manager 136 may provide support for any or all of these in order to allow greater client flexibility in creating or editing predefined input sequences, or in providing input actions to one or more mobile devices in an interactive manner.

Output processing manager 138 processes output from the monitored mobile device 101 delivered from the MDCI 104 via communication links 105. In the illustrated embodiment, the output processing manager includes bitmap matching module 140, Optical Character Recognition (OCR) module 142, and video output module 144. The bitmap matching module 140 may determine whether defined portions of display data (such as one or more display interface controls, etc.) are included in the video data provided to the CIC 106 by the NV capture interface 110. In this manner, the bitmap matching module enables interactive or defined (e.g., previously specified) input actions to be based in part on the display of expected visual indications on a display of the mobile device. For example, a portion of a defined input sequence may include an instruction to provide to the monitored mobile device 101 a "finger tap" action at certain coordinates of a touch-based display of the mobile device if an image of a particular touch control (such as a user-selectable "Send" control or other button image) is displayed within an indicated range of those coordinates on the touch-based display. In a similar manner, OCR module 142 may determine whether defined textual character sequences are included in the video data provided to the CIC 106 by the A/V capture interface 110, such as to enable interactive or defined input actions to be based in part on the appearance of particular text on the display.

The video output module 144 may, in some embodiments, provide video output data from the monitored mobile device 101 to one or more local or remote client display devices. For example, video output from the mobile device 101 may be provided to a display screen associated with one or more client devices 190 via one or more networks 199, either directly or via Web server 180, and/or to one or more client terminals (not shown) otherwise communicatively coupled to CIC 106, such as a local display device. In certain embodiments, the CIC 106 may optionally also include transcoding module 146, which may be used by the CIC to transcode the high-definition video output of A/V capture interface 110 to one or more other video formats according to specifications of a destination display device or user-selectable criteria.

In the depicted embodiment, the CIC 106 is communicatively coupled to SIM card interface 154. The SIM card interface provides selectable multiplexing of multiple SIM cards for use with monitored mobile device 101. In certain embodiments, the SIM card interface 154 may comprise a single unit with a separate interface slot for each of the multiple SIM cards to be made available for clients to use with the monitored mobile device 101; in other embodiments, the SIM card interface communicatively coupled to the CIC 106 is a network-accessible SIM server. Furthermore, in at least some embodiments, the SIM card interface 154 may include both local and networked SIM functionality. In certain situations and embodiments (such as those in which a monitored mobile device communicatively coupled to the MDCI and CIC is capable of concurrently interfacing with multiple SIM cards), the SIM card interface 154 may be used to simultaneously provide SIM card information for multiple SIM cards to the monitored mobile device. While denominated as with the term SIM herein, such designation is not intended to be limited to GSM implementations. Rather, the term subscriber identity module and acronym SIM are intended to cover any media that stores identity information that uniquely identifies a wireless communications voice and/or data services subscriber.

Web server 180 may be provided by a Mobile Device Testing Service (not shown) associated with the Mobile Device Monitoring System 160, and is communicatively coupled to the Mobile Device Monitoring System via networks 199 and/or a local connection. In the depicted embodiment, the Web server 180 provides, for client use in interacting with the monitored mobile device 101, a Graphical User Interface (GUI) 182, a command-line processor 187, and an API 188. The provided GUI 182 includes an input action recorder 184, such as may be used to record a sequence of actions performed with user-selectable controls (not shown) of the GUI. For example, a client accessing the monitored mobile device 101 via the provided GUI 182 may be enabled, using input action recorder 184, to save a sequence of actions performed with such user-selectable controls by associating the sequence of actions with a particular identifier; subsequently, the saved input sequence may be "played" or otherwise provided to monitored mobile device 101 or one or more other monitored mobile devices (such as may be communicatively coupled to one or more additional MDCI and/or CIC units, not shown, that may be associated with Web server 180) as part of testing those devices, either by the client that originally saved the input sequence or by some other client or entity. In the depicted embodiment of FIG. 1, the GUI 182 includes a command-line interface 186 to allow client users of the Web server 180 to enter individual commands or command sequences—for example, commands corresponding to various function calls of the API 188. The Web server 180 additionally includes a command-line processor 187 to interpret the individual commands or command sequences entered by the client users using command-line interface 186 such that input actions corresponding to the interpreted commands or command sequences are provided to monitored mobile device 101 via input processing manager 136 of the CIC 106. In at least some embodiments, either or both of the command-line processor 187 and API 188 may be provided as part of the CIC 106 rather than the Web server 180, or may be provided in some other appropriate manner.

The environment 100 of FIG. 1 also includes one or more client devices 190, such as may be used by one or more client users (not shown) of a Mobile Device Testing Service associated with Mobile Device Monitoring System 160. Client devices 190 may include, as non-exclusive examples, a computing system, portable email device, personal digital assistant, cell phone, smart phone, satellite phone, palmtop computing device, laptop, tablet computing device, or other appropriate network-accessible device. In certain embodiments, at least some of the client devices 190 may optionally include a GUI 192 and/or API 198, such as may be provided by one or more applications executing on the relevant client device. For example, in certain embodiments, a Mobile Device Testing Service associated with the Mobile Device Monitoring System 160 may provide one or more applications for execution on client devices 190 to enable client users of those client devices to interact with monitored mobile device 101 or other mobile devices monitored by the Mobile Device Testing Service. In other embodiments, one or more client devices 190 may interact with Web server 180 via networks 199 to access functionality provided by the Web server, including functionality provided by GUI 182, command-line processor 187, and/or API 188.

Graphical User Interface

FIGS. 2A-2D depict portions of a Graphical User Interface (GUI) 200 that may be provided to enable various client interactions with a monitored mobile device communicatively coupled to a Mobile Device Monitoring System, according to one illustrated embodiment.

Figure 2A:
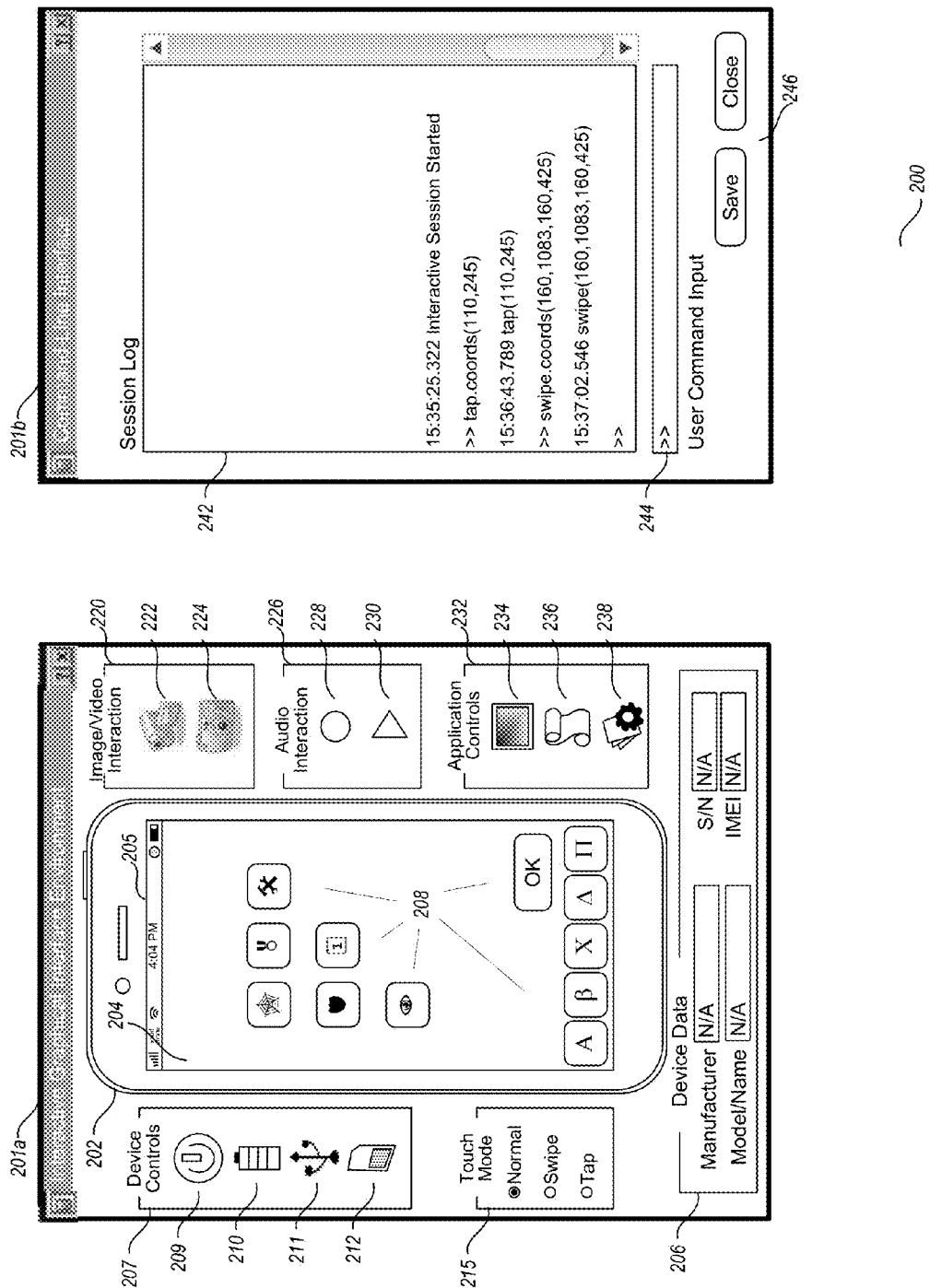
FIGS. 2A-2D depict certain portions of a Graphical User Interface (GUI) that may be provided to enable various client interactions with a monitored mobile device communicatively coupled to a Mobile Device Monitoring System, according to one illustrated embodiment.

In the illustrated example of FIG. 2A, the GUI interface 200 includes particular display portions and user-selectable controls that may be presented to an authorized user to enable the user to select and define various manners by which the CIC interacts with a monitored mobile device. In some embodiments, the GUI interface 200 may be provided to the authorized user via one or more client computing devices associated with the authorized user, such as one of client computing systems 360 of FIG. 3 and/or client devices 190 of FIG. 1. In addition, in some embodiments, some or all of the GUI interface 200 may further be available via one or more Web sites (e.g., a Web site 180 of FIG. 1 associated with a Mobile Device Testing Service, not shown), and may be provided to the authorized user via a Web browser or other software once the authorized user has been identified as being authorized. The identification of a user as being authorized may occur in various manners, such as based on concurrent or prior login activities, based on information associated with the client computing device in use by the user (e.g., identifying information about the device and/or its location, such as an IP address or a MAC address, or identifying information previously stored on the device, such as a browser cookie) or other manner. Although in the description below, the user of the GUI 200 is described as a remote user, it will be appreciated that in certain embodiments and situations, one or more users of the GUI 200 may interact with a monitored mobile device via the GUI or other interface provided locally, such as if the user is located at a geographical location shared by the CIC system, the monitored mobile device, and/or the Mobile Device Communications Interface communicatively coupled to both.

The GUI 200 as depicted includes a main interface window 201*a* and a command-line interface window 201*b*. In certain embodiments, a user of the GUI 200 may be presented with only a subset of the interface windows depicted in FIG. 2A. In other embodiments, other interface windows (such as those described below with respect to FIGS. 2B-2D, or other interface windows not currently depicted) may be presented to such a user, depending upon the functionality desired by and/or made available to that user. Additionally or alternatively, the interface windows may be presented on a contextual basis, depending on a context of current or previous user interactions. For example, as described below, the main interface window 201*a* includes various user-selectable controls for interacting with a monitored mobile device (such as the monitored mobile device 101 depicted in FIG. 1), and one or more of those various user-selectable controls may provide the user with an opportunity to further interact with the monitored mobile device using one or more distinct interface windows that are presented only after the user selects the relevant control within main interface window 201*a*. In at least some embodiments, additional interface windows may be presented to a user of the GUI 200 that are not dependent upon the selection of controls within the main interface window 201*a*. It will be appreciated that other types of user-selectable controls may be provided in other manners in other embodiments, including to enable or display types of interactions with a monitored mobile device or with other provided interfaces.

In the depicted embodiment, the main interface window 201*a* includes an illustrated device 202, representing the mobile device currently being monitored and communicatively coupled to a Communications Interface Controller (such as CIC 106 of FIG. 1) with which a user (not shown) is remotely interacting via the GUI 200; a mobile device display 204; device data display 206; device controls 207; touch mode control 215; image/video controls 220; audio interaction controls 226; and application controls 232.

The mobile device display 204 may display, in real time, the video output of the corresponding display screen of the monitored mobile device represented by illustrated device 202. In the depiction of FIG. 2A, the mobile device display 204 currently displays a status bar 205 at or near the top of the mobile device display, as well as various icons, buttons, and other visual indications of controls 208 displayed by the monitored mobile device. In at least some embodiments, the mobile device display 204 is presented to a remote user in a manner and with parameters substantially identical to that with which the display output of the monitored mobile device is captured. For example, as noted above, the display output of the monitored mobile device may be, in at least some embodiments, captured at a resolution, frame rate, and color depth identical to that which is provided by the display of the monitored mobile device (e.g., by video capture module 128 of MDCI 104 in FIG. 1). Depending on the capabilities of the computing device or other device on which the GUI 200 is displayed to the remote user, the mobile device display 204 may be displayed to the remote user using the captured resolution, frame rate, and color depth. In other embodiments and situations, the remote user may be interacting with GUI 200 using a computing device or other device with capabilities that do not support such video parameters, or may lack the network bandwidth needed to support video displayed using such parameters. In some such embodiments, the captured video output data from the monitored mobile device may be automatically transcoded (such as by transcoding module 146 of CIC 106 in FIG. 1) for real-time display to the remote user via the mobile device display 204. In other such embodiments, a user may be presented with one or more configuration options related to the video parameters for use in displaying the display output of the monitored mobile device via the mobile device display 204.

In at least some embodiments, the mobile device display 204 may correspond to a touchscreen of the monitored mobile device, and the remote user may interact with the monitored mobile device by interacting with the mobile device display 204. For example, if the GUI 200 is displayed to the remote user using a typical computing device that includes a mouse, trackpad or other pointing device, the remote user may interact with the mobile device display 204 by moving a displayed cursor of the computing device with the pointing device, and clicking on the mobile device display (such as on one or more buttons or other user-selectable controls of the monitored mobile device currently displayed by the mobile device display). In certain embodiments and situations, if the GUI 200 is displayed to the remote user using a computing device equipped with a touchscreen, the remote user may interact with the monitored mobile device by interacting with the mobile device display 204 in a manner substantially identical to that which would be utilized directly with the monitored mobile device.

It will be appreciated that the monitored mobile device corresponding to illustrated device 202 may not include a touchscreen, such as if the monitored mobile device includes a non-touch-enabled display screen and one or more physical buttons or similar actuators to support user interaction with the monitored mobile device. In at least some embodiments, the main interface window 201*a* may therefore display one or more user-selectable controls corresponding to each of the one or more physical buttons or related actuators on the monitored mobile device, either as part of mobile device display 204 or elsewhere.

Device data 206 is depicted within the main interface window 201*a* and below the illustrated device 202. The device data includes information specific to the mobile device currently being monitored and corresponding to the illustrated device 202. In the depicted embodiment, device data 206 includes identifiers corresponding to the manufacturer of the monitored mobile device, the model or name of the monitored mobile device, the serial number ("S/N") of the monitored mobile device, and the International Mobile Station Equipment Identity ("IMEI") number of the monitored mobile device. In other embodiments, other information related to the monitored mobile device may be displayed as part of device data 206, and certain information depicted in the embodiment of FIG. 2A may be altered or omitted. A non-exclusive list of examples of the types of information that may be displayed as part of device data 206 or elsewhere within the GUI 200 include: a name and/or version number of an operating system of the monitored mobile device; one or more IP addresses (such as one or more public or private network addresses) of the monitored mobile device; a name or other information related to a current cellular service provider associated with the monitored mobile device; information related to one or more users or service subscribers associated with the monitored mobile device; a telephone number associated with the monitored mobile device; a geographical location associated with the monitored mobile device; available services and/or levels of service, signal strengths, voltage, current and/or charge levels, etc.

Device controls 207 in the depicted embodiment include: a power control 209, such as may correspond to a power button or related actuator on the monitored mobile device; a battery control 210, enabling a remote user to simulate the act of removing and/or inserting a battery into the monitored mobile device, and which in some embodiments may additionally provide a visual indication of a current battery level of the monitored mobile device; USB control 211, which may in certain embodiments enable the installation of various software on the monitored mobile device, the emulation of various "tethering" functionality related to operations of the monitored mobile device, the use of the monitored mobile device as a storage device, or combination of such functionality; and SIM control 212, which enables remote users of the GUI 200 to select from multiple SIM cards to use with the monitored mobile device. In certain embodiments, for example, selecting SIM control 212 may result in displaying an additional interface window (not shown) to the remote user, allowing the user to manually select from multiple SIM cards made available via the CIC system for provision to the monitored mobile device, as if that particular SIM card were locally inserted into the monitored mobile device. Additionally, the SIM control 212 may enable one or more remote users to emulate the removal of a SIM card previously coupled to the monitored mobile device, such as if it is desirable to observe the behavior of the monitored mobile device while no SIM card is present.

Touch mode control 215 enables a remote user to select one of several modes available for interacting with the mobile device display 204. In the depicted embodiment, the modes available for user selection include "Normal," "Swipe," and "Tap." In certain embodiments, a "Normal" mode indicates that actions of the remote user (such as interactions made via mouse, trackpad, touchscreen, or other pointing device locally available to the remote user) are treated as directly analogous to actions made to the corresponding touchscreen of the monitored mobile device. For example, a selection or "click" with a mouse or other pointing device at particular coordinates of the mobile device display 204 may result in a "tap" input action being provided to the monitored mobile device using the corresponding coordinates of a display of the monitored mobile device. Similarly, a "click-and-drag" action using a pointing device of the remote user between two coordinate points on the mobile device display 204 may result in a "swipe" input action between the corresponding coordinate points on the display of the monitored mobile device. In at least some embodiments, the "Swipe" mode of touch mode control 215, when selected, provides an indication to the associated CIC system that all remote user interactions with mobile device display 204 are to be provided to the monitored mobile device as "swipe" input actions. For example, while "Swipe" mode is selected, two successive selections of distinct coordinate points on the mobile device display 204 may be interpreted as a "swipe" input action occurring between those distinct coordinate points, rather than as successive "tap" input actions (such as may be provided to the monitored mobile device if the "Normal" mode was selected by a user via touch mode control 215). Similarly, in certain embodiments, the "Tap" mode of touch mode control 215, when selected, provides an indication to the associated CIC system that all remote user interactions with mobile device display 204 are to be provided to the monitored mobile device as "tap" input actions. In "Tap" mode, for example, a click-and-drag action using a pointing device of the remote user between two coordinate points on the mobile device display 204 may be provided to the monitored mobile device as a single "tap" input action performed using the first of those two coordinate points. In other embodiments and situations, other modes may be available to a remote user via the touch mode control 215. For example, additional modes made available via touch mode control 215 may enable a remote user to emulate multi-digit operations of the monitored mobile device, such as two-finger "pinch-to-zoom" functionality, three-finger swipe functionality or other functionality of the monitored mobile device that typically involves the use of multiple digits in a simultaneous manner. Furthermore, in certain embodiments and situations, touch mode control 215 may be disabled or omitted from the main interface window 201a entirely (such as if the monitored mobile device does not include a display screen with touch capabilities, etc.).

In the embodiment depicted in FIG. 2A, image/video interaction controls 220 include video capture control 222 and screen capture control 224. Video capture control 222 enables a remote user to select a portion of the video output displayed by mobile device display 204 for local capture and storage. In certain embodiments, invoking video capture control 222 begins local capture and storage of the output of the mobile device display 204; invoking the video capture control 222 again may end the local capturing, and prompt the remote user for a filename and/or location to use for storing a local copy of the captured video data. In at least some embodiments, the video data stored in this manner may include the full resolution, frame rate, color depth and other video parameters of the display output of the monitored mobile device captured by the CIC system, regardless of whether such output has been transcoding for real-time display on the mobile device display 204. In other embodiments, the stored video data may share the video parameters of the video data transcoded for display by mobile device display 204. In certain embodiments, the remote user may select various parameters for the video data captured and stored via video capture control 222, and may do so independently of such parameters for other video data (such as the video data captured by the CIC system or, if transcoded, provided by the mobile device display 204). In certain embodiments, audio output of the monitored mobile device is captured and stored along with any video data captured using the video capture control 222; in other embodiments, the remote user may provide one or more configuration settings to allow the CIC system or GUI 200 to determine whether audio output will be stored with the captured video data.

In a manner similar to that described for video capture control 222, screen capture control 224 enables the remote user to locally store captured images corresponding to the display of mobile device display 204 at the time the user invokes the screen capture control. In certain embodiments, such captured images may retain the resolution and color depth captured by the CIC system from the monitored mobile device. In other embodiments, if the mobile device display 204 displays video transcoded for display on the remote user's computing device, images captured by invoking the screen capture control 224 may be stored using the resolution and color depth provided by the transcoded video data; and in at least some embodiments, the remote user may select various parameters such as resolution and color depth independently of such parameters as presented by the mobile device display. Upon invoking the screen capture control 224 or at some other appropriate time, the remote user may be prompted for one or more filenames and/or file locations to use when storing screen images captured in this manner.

The audio interaction controls 226 include, in the depicted embodiment, audio recording control 228 and audio playback control 230. The audio recording control 228 allows the remote user to locally record and store audio output data of the monitored mobile device, and may in some embodiments be presented with one or more configuration options (such as filename, storage location, audio bit rate, or other appropriate options) upon invoking the audio recording control 228 or at some other appropriate time. The audio playback control 230 allows the remote user to interact with the monitored mobile device by providing audio input to the monitored mobile device via the GUI 200. For example, the remote user may be able to provide audio input via one or more microphones local to the remote user that is, in turn, provided to the monitored mobile device as if the remote user were speaking directly into one or more microphones of the monitored mobile device. As another example, the remote user may be prompted in certain situations for one or more stored audio files to be provided to the monitored mobile device as audio input.

In the depicted embodiment of FIG. 2A, application controls 232 include a command-line interface control 234, a script manager control 236, and configuration control 238. The command-line interface control 234 allows the remote user to display a command-line interface within a distinct window of the GUI 200, such as command-line interface window 201b described below. The script manager control 236, in a similar manner, enables the remote user to display a distinct window of the GUI 200 (such as script manager windows 201c-201e, described below with respect to FIGS. 2B-2D) that includes additional user-selectable controls for defining, recording and managing sequences of input actions that may then be "played back" or otherwise provided to the monitored mobile device (such as via the input processing manager 136 of FIG. 1). In other embodiments, some or all of the user-selectable controls displayed within windows 201b and 201c-201e (FIGS. 2B-2D) may be provided in other forms, such as included within main interface window 201a of the GUI 200. The configuration control 238 provides the remote user with access to various configuration options related to the GUI 200 and, in certain embodiments, other configuration options generally related to interacting with the monitored mobile device. For example, configuration control 238 may display one or more distinct configuration windows to the remote user such that the remote user is able to change configuration options related to the device controls 207 (e.g., a manner in which SIM cards are to be selected when invoking SIM control 212, various power options related to power control 209, etc.); touch mode controls 215; image/video interaction controls 220 (e.g., default parameters for captured video data, default filenames or file locations for storing such captured video data, etc.); and/or audio interaction controls 226 (e.g., default parameters for captured screen images, default filenames or file locations for storing such images, etc.).

The command-line interface window 201b includes a session log 242, a command entry line 244, and window controls 246, and enables the remote user to provide one or more input actions to the monitored mobile device in an interactive manner using text-based commands, such as may be based on one or more programmatic interfaces additionally provided by the CIC system or associated Mobile Device Testing Service. In at least some embodiments, any input action that may be provided to the monitored mobile device via user interactions with the main interface window 201a may also be provided via one or more textual commands using the command-line interface window 201b. Additionally, in at least some embodiments, the command-line interface window enables various logging functionality related to output from the monitored mobile device, either resulting from commands entered via the command-line interface window or otherwise. For example, in an embodiment, the session log 242 may display a record of commands entered via command entry line 244. In certain embodiments, the session log may additionally display output from the monitored mobile device responsive to such entered commands, or display additional text-based output from the monitored mobile device. In certain embodiments, the remote user may provide one or more configuration settings (such as by invoking configuration control 238 of the main interface window) related to the amount of information to be displayed by the session log 242. For example, the session log 242 may be configured to display textual information related to all interactions made with the mobile device display 204 or all user input actions provided to the monitored mobile device, regardless of whether those input actions were provided as a result of interactions with the GUI 200 or otherwise. In the example illustrated by FIG. 2, the session log 242 includes a timestamp indication of the time at which the current interactive session began, followed by two commands entered via command entry line 244 ("tap.coords(110, 245)" and "swipe.coords(160,1083,160,425)") and the timestamps and textual output respectively associated with each of those two entered commands ("15:36:43.789 tap(110, 245)" and "15:37:02.546 swipe(160,1083,160,425)"). Also in the depicted embodiment, the window controls 246 include "Save" and "Close" controls, such as may be selected by the remote user to locally store the contents of the session log 242 or close the command-line interface window 201b, respectively.

Figure 2B:
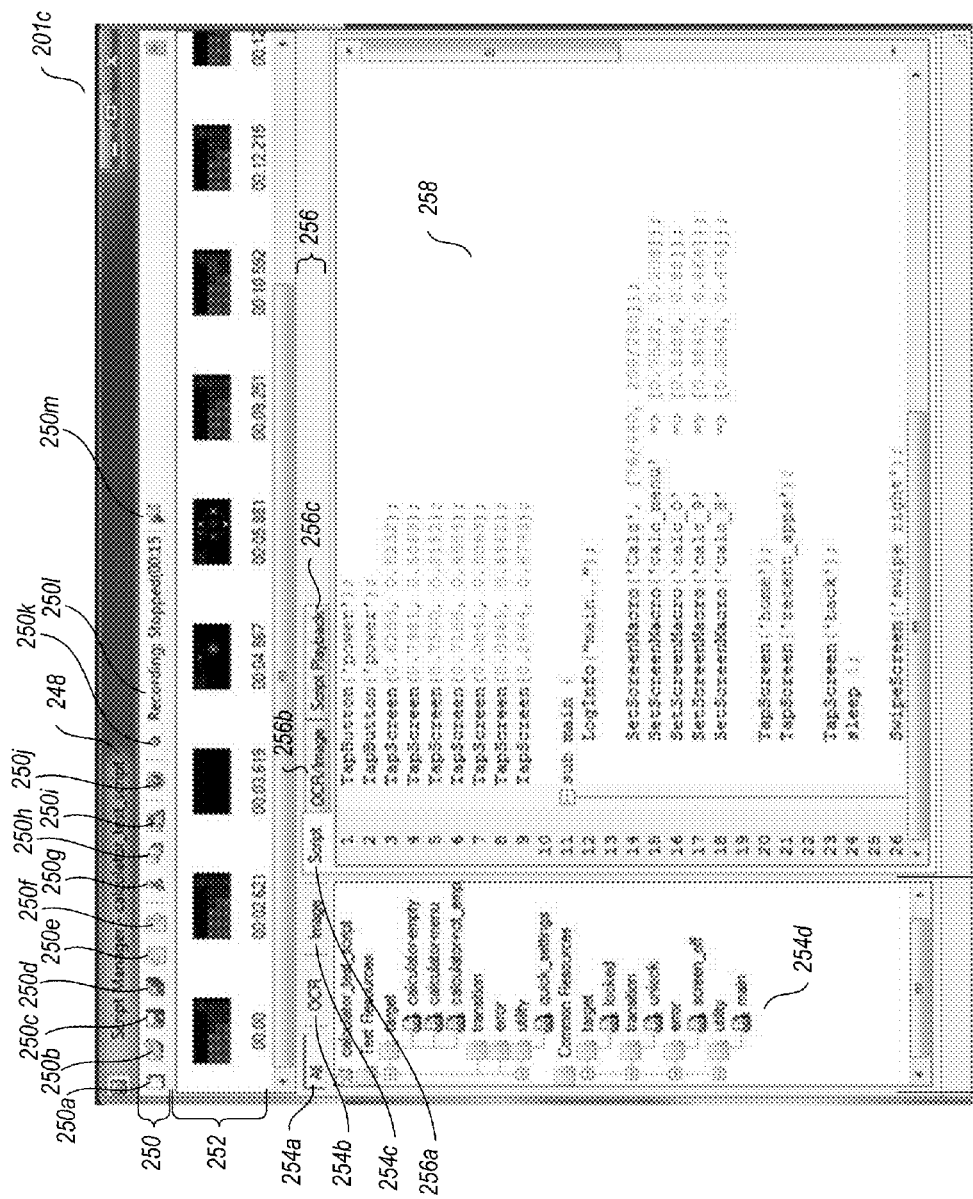

FIG. 2B shows script manager interface window 201c, such as may be displayed if the user selects the script manager control 236 of main interface window 201a (FIG. 2A), for use in creating and/or editing scripts that may include multiple defined input sequences, as well as defined triggers or other statements to initiate or initiate a response to such input sequences in various manners. In particular, a remote user may be enabled by the CIC system and/or Mobile Device Testing Service to insert or remove individual input actions included in an existing defined input action sequence using the script manager interface window, such as to include one or more "triggers" or other flow-control actions into a defined input action sequence. For example, in order to emulate the remote user waiting for an initiated application program to begin executing before providing additional user input, as part of defining a script a user may specify that the input action sequence is to wait until particular output is displayed by a display of the monitored mobile device, such as a particular portion of video data (such as may be recognized by bitmap matching module 140 of FIG. 1) or particular textual information (such as may be recognized by OCR module 142 of FIG. 1). In certain embodiments and circumstances, the script manager interface window may be displayed adjacent to or otherwise in conjunction with the main interface window 201a, or in lieu of the main interface window.

In the depicted embodiment, the script manager interface window 201c includes a title bar 248 (identifying the script currently loaded for editing and/or execution as "calculator_test_script"); a toolbar 250; a snapshot bar 252; a resource panel 254; panel mode selection tabs 256; and editing panel 258.

The toolbar 250 includes a new script control 250a, allowing a user to begin creating a script in a clean environment; an open script control 250b, allowing a user to open an existing script for execution or editing; a save script control 250c, allowing the user to save the current script for later execution or editing; a "save all" control 250d, allowing the user to save all files associated with the current scripting environment, such as may include particular input action sequences, various resources, etc.; import script control 250e, allowing the user to import a script or scripting environment from an external source, such as may have been created by a distinct other user and/or a distinct client device; export script control 250f, allowing the user to export a script or scripting environment for later use by an external source, such as a distinct other user and/or a distinct client device; cut/copy/paste/help controls 250g, 250h, 250i and 250j, respectively; script recording control 250k, allowing the user to record interactions with the current monitored mobile device (such as interactions via the mobile device display 204 of the main interface window 201a in FIG. 2A) for potential inclusion within a script; recording indicator 250l, currently indicating that recording of such user interactions has stopped after being active for 15 seconds; and script playback control 250m, allowing the user to execute the current script as one or more input action sequences provided to the current monitored mobile device.

The snapshot bar 252 includes a series of thumbnail images 252a corresponding to images captured of the primary display associated with the current monitored mobile device, such as that displayed by mobile device display 204 (FIG. 2A). Each thumbnail image 252a is associated with a snapshot time index 252b, indicating a time index at which the associated screen image was captured (such as, in the illustrated embodiment, relative to the time at which execution of a particular script was initiated). In certain embodiments, the thumbnail images 252a may be captured at automatic intervals; responsive to particular actions or commands within the executing script; responsive to particular output provided by the monitored mobile device; manually triggered by the current user; or some appropriate combination of any or all of these. In at least some embodiments, the current user may select one or more of the thumbnail images 252a for various purposes—for example, to begin execution of a script at a point that corresponds to the selected thumbnail image, or to interact with portions of a script corresponding to one or more selected thumbnail images (such as to save, extract, execute or delete such portions) independently of those portions corresponding to thumbnail images that are not selected by the user.

The resource panel 254 includes resource filter tabs 254a-c and resource listing 254d, and provides a list of resources for use in creating scripts or input action sequences related to one or more monitored mobile devices. In certain embodiments, such resources may include, for example, "OCR" or "Image" resource types, such as may be used to respectively identify textual or image-based display output with which a defined script may interact. For example, a listed "image" resource may indicate one or more portions of display output that may be used as a trigger for various actions provided as part of the defined script, such that when a portion of the mobile device display output matches the image resource (e.g., when matched by the bitmap matching module 140 of FIG. 1), one or more input actions are initiated based on such output. Similarly, a listed "OCR" resource may be used to trigger various defined script actions when textual data matching the OCR resource is detected as part of the mobile device display output (e.g., by the OCR module 142 of FIG. 1). In certain embodiments, by selecting a particular resource listed within the resource listing 254d, a user may insert one or more textual commands for use within editing panel 258. As one example, by positioning a selection cursor (not shown) within the editing panel 258 and then selecting the "calculator-menu" resource within the resource listing 254d, one or more commands may be inserted for use within the editing panel that, when executed, cause input actions to be provided to the current monitored mobile device that initiate the display of a menu within a calculator application on the monitored mobile device. Such commands may be edited by the user via the editing panel 258, or included within a script without revision.

In the illustrated example of FIG. 2B, the "Script" panel mode selection tab 256a is currently selected, such that the editing panel 258 is currently displayed. The editing panel includes the text of the current script loaded into memory by the user for editing and/or execution. In at least some embodiments, and as noted above with respect to command-line interface window 201b (FIG. 2A), input actions that may be provided to the monitored mobile device via the main interface window 201a (FIG. 2A) may also be provided via one or more textual commands, such as by using the command-line interface window 201b or the editing panel 258. In the illustrated embodiment, editing panel 258 includes various Perl textual commands that define input actions to be provided to the monitored mobile device upon execution of some or all of the current "calculator_test_script". As discussed elsewhere, in various embodiments input actions may be represented and provided to the monitored mobile device using a variety of other syntax types.

Figure 2C:
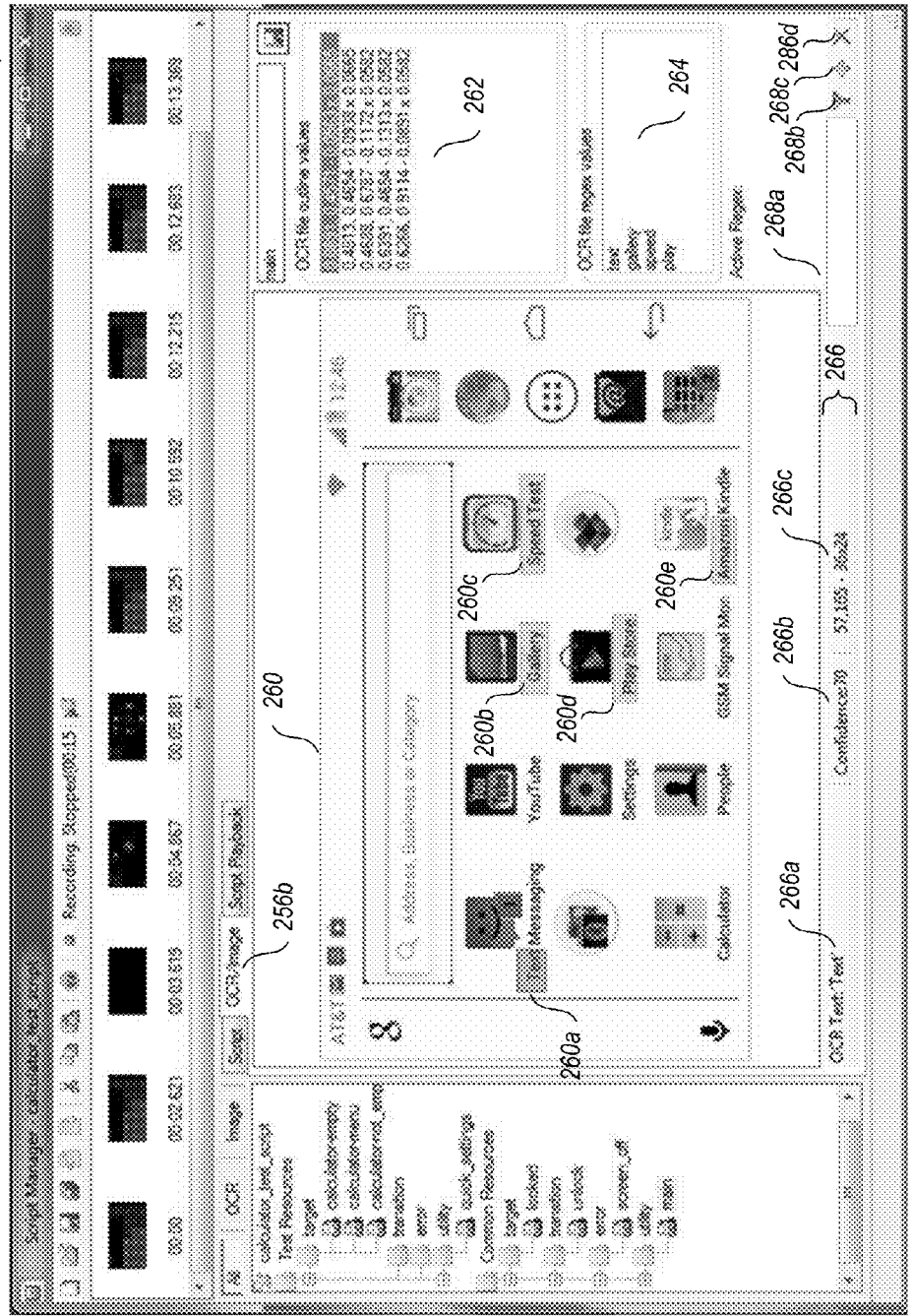

FIG. 2C shows script manager interface window 201d, such as may be displayed if the user selects the "OCR/Image" panel mode selection tab 256b within the script manager interface window 201c of FIG. 2B. Responsive to such selection, editing panel 258 has been replaced with recognition panel 260, allowing a user to define and edit regions of interest, such as regions of a captured image from the monitored mobile device that may be used to create OCR and image resources; region listing 262; expression value listing 264; region property indicators 266; and expression filter controls 268.

The recognition panel 260 displays a screenshot of the monitored mobile device that currently includes regions of interest 260a (highlighting "Text)," 260b (highlighting "Gallery"), 260c (highlighting "Speed Test"), 260d (highlighting "Play Store"), and 260e (highlighting "Amazon"). Each of the regions of interest 260a-e respectively corresponds to entries 262a-e of the region listing 262, displayed as pairs of screen coordinates that are respectively associated with each of the highlighted regions of interest that have been defined using the recognition panel 260. In the illustrated embodiment, region listing 262 uses normalized coordinates to indicate the highlighted regions of interest; in other embodiments, pixel coordinates or other system may be designated to represent the highlighted regions of interest. The expression value listing 264 includes expressions that may be applied during OCR operations with respect to the regions of interest highlighted in the recognition panel 260. In the illustrated embodiment, the values displayed within the expression value listing are regular expressions; in other embodiments and situations, various expression types and syntaxes may be utilized, either in conjunction with or in lieu of regular expressions. In the illustration of FIG. 2C, region of interest 260a is currently selected, and various characteristics of that region are displayed by the region property indicators 266. In particular, recognized text indicator 266a indicates the text that has been identified within the selected region (such as by the OCR module 142 of FIG. 1); confidence indicator 266b indicates a confidence value corresponding to that identified text within the selected region; and coordinate indicator 266c indicates the numerical coordinates occupied by the selected region of interest. In the illustrated embodiment, the coordinate indicator 266c utilizes non-normalized pixel coordinates to indicate the upper-left corner of the selected region ("57, 165") and the size of the selected region expressed in pixels ("36× 24"). In other embodiments, various coordinate systems and/or other indicative schema may be used to indicate the location and size of the selected region of interest. The expression filter controls 268 allow the user to provide an expression (such as a regular expression in the illustrated embodiment) using expression entry control 268a to test the use of that expression with respect to the captured screen image displayed by the recognition panel 260. The remaining expression filter controls 268 allow the user to apply the expression (via 268b); to add the expression entered via entry control 268a to the expression listing 264 (via 268c); and to clear the entered expression (via 268d).

Figure 2D:
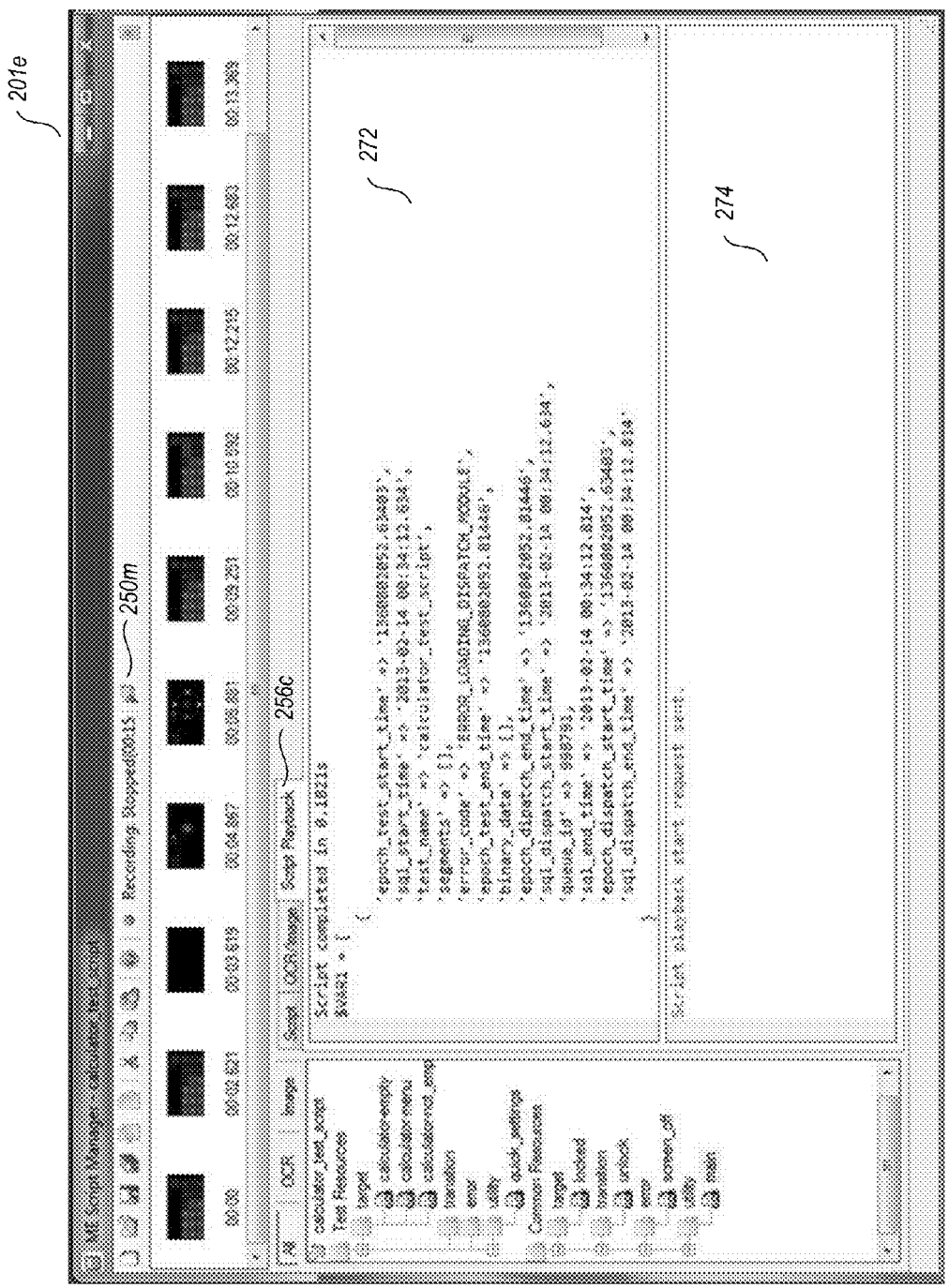

FIG. 2D shows the script manager interface window 201e, such as may be displayed if the user selects the "Script Playback" panel mode selection tab 256c. Responsive to such selection, the playback output panel 272 and error panel 274 are displayed. By viewing the playback output panel and error panel, a user may be provided with an indication of the previously executed and currently executing script commands (via playback output panel 272) and any errors that result from executing those commands (via error panel 274) when executing a defined script using the script manager interface window, such as by selecting the script playback control 250m. In various embodiments, one or both of the playback output panel and error panel may additionally provide other visual indications of information related to current and previous execution of the current script.

It will be appreciated that the details of the GUI interfaces are provided for illustrative purposes only, and that in other embodiments additional graphical components or user-selectable controls may be provided in other manners, such as in other locations of a Web page, with or without overlapping and/or overlaying other portions of the graphical user interface, in one or more separate frames or other display portion of the Web page, in a separate pop-up window or other separate display area that is associated with but not part of the Web page, being initiated or controlled in various manners (e.g., via JavaScript, HTLM5, cascading style sheets, Adobe Flash, Ajax, Dynamic HTML, by dynamically modifying the content of the Web page, etc.), etc. In addition, it will be appreciated that various user-selectable controls may be provided to enable additional interactions with a monitored mobile device via the CIC and/or MDCI. Similarly, the particular types of user-selectable controls that are displayed are simplified for the sake of understanding, and other types of controls may be displayed in other embodiments.

Specific Example of Operation—Defining and Using an Input Action Sequence via a Provided Graphical Interface As one specific example of operations enabled by the GUI elements of FIGS. 2A-2D as provided by a Mobile Device Testing Service in conjunction with a Mobile Device Monitoring System (such as the Mobile Device Monitoring System 160 depicted in FIG. 1), a remote user may define a sequence of user input actions to be provided to one or more monitored mobile devices at a later time. Such may, for example, be part of a testing program designed to determine the cause of one or more application crashes when a particular application program is used on various models of mobile devices. For instance, suppose that the remote user has received multiple end-user reports that a particular application XXYY routinely crashes on a particular model of mobile device if the mobile device receives audio input (such as one or more voice commands) while application XXYY is executing on the mobile device. For the sake of brevity with respect to the description of the operations below, assume that a relevant model of mobile device (having a primary touch-enabled display that is currently powered off) is being monitored by the Communications Interface Controller of the Mobile Device Monitoring System via a Mobile Device Communications Interface communicatively coupled to the monitored mobile device, and that the remote user desiring to define the input action sequence has successfully accessed a Web server provided by the Mobile Device Testing Service that is displaying a graphical user interface substantially similar to the GUI 200 depicted in FIG. 2A.

The remote user interacts with the GUI 200 using a client device associated with the remote user that includes a mouse-type pointing device and sufficient bandwidth and display capabilities to display video output of the monitored mobile device according to the parameters of the primary display of the monitored mobile device—in particular, the associated client device has capabilities such that the full resolution, frame rate and color depth of the monitored mobile device's primary display are provided to the remote user via GUI 200 and mobile device display 204. However, because the monitored mobile device is currently powered off, the mobile device display 204 currently provides no information.

In order to begin recording the input actions provided to the monitored mobile device, the remote user first invokes the script manager control 236 by using the client pointing device to select the script manager control, initiating the display of script manager interface window 201c as depicted in FIG. 2B. The remote user then similarly invokes the script recording control 250k (FIG. 2B), initiating the recording of subsequent input actions performed via the main interface window 201a. Optionally, the remote user may also determine that the display output of the monitored mobile device should be locally captured and stored for testing purposes, and may therefore additionally use the client pointing device to invoke the video capture control 222 and thus initiate capturing real-time video data corresponding to output of mobile device display 204. In at least some embodiments, if the remote user does decide to invoke the video capture control, that user action is recorded by the script manager to become the first input action in the input action sequence to be defined. In other embodiments, as the act of initiating the local capture of the video data is not provided to the monitored mobile device, the selection of the video capture control 222 may not be recorded.

As a first interaction with the monitored mobile device via GUI 200, the remote user uses the client pointing device to select power control 209. Invoking the power control 209 initiates the sending of an indication to the input processing manager of the CIC system, which in turn sends an indication to the power interface of the MDCI that the monitored mobile device is to be powered ON, in a manner substantially identical to that which would be received by the monitored mobile device if a local user activated the power button on the monitored mobile device. Responsive to the signal provided by the power interface, the monitored mobile device provides power and display signals to a primary display of the monitored mobile device. These signals are captured by the A/V capture interface of the MDCI communicatively coupled to the monitored mobile device, and the A/V capture interface translates those captured signals to video data that it then provides to the output processing manager of the CIC system. In real time, the CIC system provides this video data to the Mobile Device Testing Service's Web server, which displays the captured video data to the remote user via GUI 200 and mobile device display 204. In this manner, the remote user turns the primary display of the monitored mobile device ON, and views the display output of the monitored mobile device in real time as its display is activated.

The remote user notes that touch mode control 215 indicates that the GUI 200 is operating in "Normal" touch mode, and therefore proceeds to navigate the mobile device display 204 using the client pointing device in a manner similar to that with which the user would locally operate a touchscreen of the monitored mobile device with a finger or other digit. Each interaction of the remote user with mobile device display 204 is recorded by the script manager and provided to the input processing manager of the CIC system, and to the monitored mobile device via the touch input decoder of the MDCI's I/O interface. Simultaneously, video output data of the monitored mobile device is captured via a separate channel of the MDCI by the A/V capture interface, and provided to the GUI 200 via the output processing manager of the CIC system for display to the remote user via mobile device display 204 and, in certain embodiments and situations, textually via session log 242 and/or the playback output panel 272 (FIG. 2D). In this manner, the remote user may initiate the execution of one or more application programs on the monitored mobile device other than application XXYY, such as to first test the providing of audio input to the monitored mobile device while executing applications other than that which was reported as routinely crashing. For example, the remote user may use the local client pointing device to select or "click" an application icon associated with application ABC (resulting in a corresponding "tap" input action being provided to the monitored mobile device and being recorded by the script manager) to execute that application; wait for a display screen associated with application ABC to be displayed on the mobile device display 204, and then invoke audio playback control 230 to provide audio input in the form of one or more verbal commands (e.g., a voice-initiated search function or other spoken command) to the monitored mobile device while that device is executing application ABC. In a similar manner, the remote user may choose to execute and provide audio input to one or more applications other than application XXYY or application ABC prior to executing and providing audio input to application XXYY for testing purposes.

A variety of other tests of the monitored mobile device may be performed by the remote user as part of the recorded input action sequence to be defined. For example, the remote user may determine that the testing of future monitored mobile devices may be improved by utilizing multiple SIM cards during such testing (such as may correspond to multiple cellular service providers), and may therefore invoke SIM control 212 while recording the input action sequence to simulate extracting and inserting one or more SIM cards from and to the monitored mobile device. Such input actions are recorded by the script manager and provided to the monitored mobile device via the input processing manager of the CIC system and the SIM interface of the MDCI. As another example, the remote user may determine to utilize a command-line interface of the GUI 200 to provide one or more input actions to the monitored mobile device using text-based commands, and therefore invoke command-line interface control 234 to display command-line interface window 201b for that purpose. In at least some embodiments, input actions recorded via the script manager may be textually displayed by the editing panel 258 of FIG. 2B as such input actions are interactively provided by the user via the main interface window 201a.

Once the remote user is satisfied that the input actions needed to perform tests on future monitored mobile devices have been performed and recorded, he or she may again invoke the script recording control 250k to stop recording input actions performed via the main interface window 201a. In order to define the input action sequence corresponding to the input actions recorded during the current session, the remote user selects the save script control 250c, allowing the user to enter an identifier (such as a filename) for the input action sequence and to persistently save the input action sequence as a script for future use. In order to provide the input action sequence to the current monitored mobile device, the remote user may select the open script control 250b to select the saved script file and "Open" the script containing the recorded input action sequence, and invoke script playback control 250m to begin "playback" of the recorded input action sequence.

In certain embodiments, a single defined script or input action sequence may be simultaneously or concurrently provided to a plurality of monitored mobile devices in an automated manner using a corresponding plurality of mobile device communications interfaces that are communicatively coupled to one or more communications interface controllers. In this manner, an input action sequence defined by a single remote user or other client of an associated Mobile Device Testing Service may be used to concurrently test dozens or hundreds of mobile devices under varied but controlled conditions and circumstances. In at least some embodiments, the CIC system and/or mobile device testing service may facilitate such use of defined scripts or input action sequences by allowing the user to import and/or export scripts and associated resources using the script manager interface (such as by invoking the import script control 250e or export script control 250f of FIG. 2B, or in some other manner).

Exemplary Controller Computing System

Figure 3:
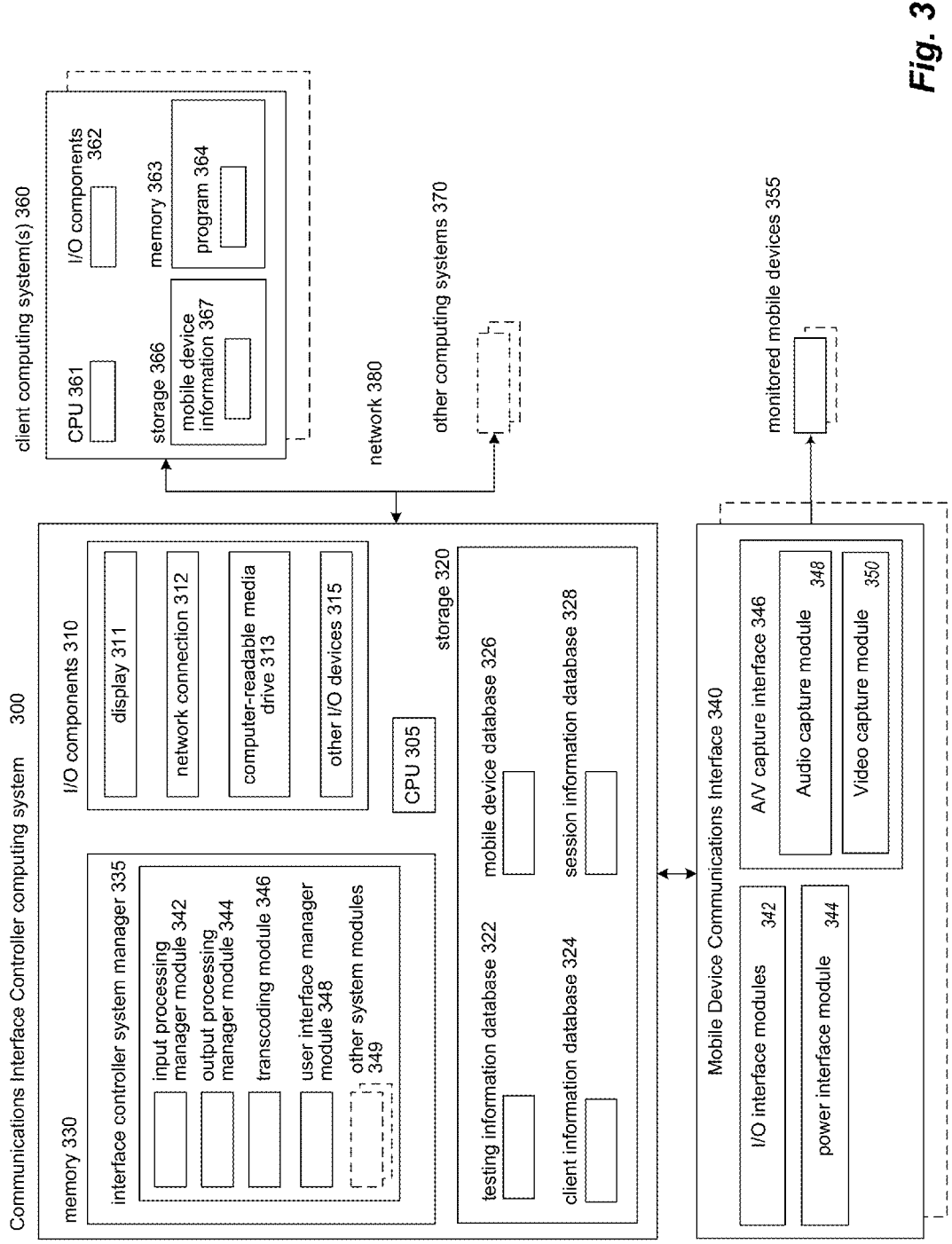
FIG. 3 illustrates a Communications Interface Controller (CIC) computing system suitable for executing an embodiment of an interface controller system manager that performs at least some of the described techniques.

FIG. 3 illustrates a Communications Interface Controller (CIC) computing system 300 suitable for executing an embodiment of a Communications Interface Controller that provides a mobile device interface Web server, as well as Mobile Device Communications Interfaces 340, monitored mobile devices 355, various client computing systems 360, and other computing systems 370.

In the illustrated embodiment, the CIC computing system 300 includes a CPU 305, various I/O devices 310, storage 320, and memory 330. The I/O devices include a display 311, a network connection 312, a computer-readable media drive 313, and other I/O devices 315. An embodiment of an interface controller system manager 335 is executing in memory, and includes an input processing manager module 342; and output processing manager module 344; a transcoding module 346; the user interface manager module 348; and optionally, other system modules 349.

The interface controller system manager 335 interacts with the client computing systems 360 and the other computing systems 370 over the network 380 using the network connection 312 (e.g., via the Internet and/or the World Wide Web, cell network, telephone network, etc.). In particular, users of client computing systems 360 may interact with the CIC system in order to perform various interactions with one or more of the monitored mobile devices 355 (e.g., providing one or more input actions or defined input sequences, and observing the resulting output) via mobile device interfaces 340, such as by using application program 364 (e.g., a Web browser or custom application) executed by CPU 361 and in memory 363 to use mobile device information 367 (e.g., information about one or more of the monitored mobile devices and their associated capabilities, etc.) of storage 366. The interface controller system manager 335 additionally interacts with each of monitored mobile devices 355 via a corresponding one of the Mobile Device Communications Interfaces (MDCI) 340.

The CIC system and its modules may also access and use various client information, mobile device information and device-related information on storage 320 or elsewhere, such as information stored in one or more of testing information database 322, client information database 324, mobile device database 326, and session information database 328. In addition, in some embodiments the CIC system may also interact with other optional systems 332 executing in memory 330 and/or other optional computing systems 370 to perform additional related functionality.

The MDCI 340 each include various modules having functionality described above with respect to their corresponding modules in FIG. 1. In particular, MDCI 340 include I/O interface modules 342; a power interface module 344; and an A/V capture interface 346, which in turn includes an audio capture module 348 and video capture module 350.

Those skilled in the art will appreciate that computing systems 300, 360, and 370, as well as mobile device interfaces 340 and monitored mobile devices 355, are merely illustrative and are not intended to limit the scope of the present invention. The CIC system may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or device may comprise any combination of hardware or software that can interact, including (without limitation) desktop or other computers, network devices, PDAs, cell phones, smart phones, tablet computing systems, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the discussed CIC system modules may in some embodiments be combined in fewer modules or distributed in additional modules. Similarly, in some embodiments, the functionality of some of the modules may not be provided as part of the CIC system and/or other additional functionality may be available.

in at least some embodiments, one or more of the illustrated modules and/or systems may be software-based modules/systems including software instructions that, when executed by the CPU(s) 305 or other processor(s), program the processor(s) to automatically perform the described operations for that module/system. Furthermore, in some embodiments, some or all of the systems and/or modules may be implemented or provided in other manners, such as at least partially or wholly in designed and configured firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system via inter-computer communication. Such computer program products may also take other forms in other embodiments. Accordingly, the present invention may be practiced with other computer system configurations.

Specific Example of Operation—Input Processing Manager

FIG. 4 is a flow diagram of an example embodiment of an Input Processing Manager routine 400. The routine may be provided by, for example, execution of an embodiment of the CIC 106 of FIG. 1 and/or of input processing manager module 342 of the interface controller system manager 335 in FIG. 3, such as to enable one or more client devices to monitor and interact with a mobile device that is communicatively coupled to a Mobile Device Interface as described herein.

The routine begins at block 402, in which the routine receives an indication that a connection with a mobile device to be monitored has been made, such as by communicatively coupling the mobile device to a Mobile Device Communications Interface (e.g., MDCI 104 in FIG. 1, or MDCI 340 in FIG. 3). The routine then proceeds to block 404 to begin capturing output data from the monitored mobile device via the MDCI. Captured output data is provided to one or more client devices (such as over one or more intermediate networks, e.g., the Internet) and may, in some embodiments, be stored using one or more storage devices communicatively coupled to the CIC system. In block 406, the routine may optionally initiate an interactive testing mode of the CIC system, such as to support one or more input actions that may be interactively provided by the client or clients to which captured output data is being provided. The routine then proceeds to block 408, in which an indication is received of one or more input actions intended for the monitored mobile device, and then to block 410 to determine the type of indicated input action(s) received.

If it is determined in block 410 that a defined input sequence has been received, the routine proceeds to block 414 to optionally initiate an input sequence testing mode of the CIC system. For example, in certain embodiments, the CIC system may determine to defer or even ignore interactive input actions that are received from one or more clients while operating in the input sequence testing mode. In other embodiments, the CIC system may allow such interactive input actions while the received defined input sequence is still being provided to the monitored mobile device, but only under certain conditions or using defined (e.g., previously defined) criteria for accepting such interactive input actions. As one example, while operating in the input sequence testing mode, the CIC system may prevent the monitored mobile device from receiving interactive input actions that are provided by a client using a GUI provided by the CIC system or associated computing device, but allow the monitored mobile device to receive such interactive input actions when provided by a client using a command-line interface.

After block 414, the routine proceeds to block 416 and provides one or more input actions included in the received input sequence to the monitored mobile device in accordance with the parameters and actions defined within the received input sequence. As one example, the received defined input sequence may include multiple input actions to be provided to the monitored mobile device at determined (e.g., previously determined) times or at specified regular intervals regardless of the output received from the monitored mobile device. As another example, one or more of the multiple input actions included in the received defined input sequence may be provided to the monitored mobile device only upon detection of particular expected output that is received from the monitored mobile device (such as may be detected by bitmap matching module 140 or OCR module 142 in FIG. 1) in response to one or more earlier input actions of the defined input sequence. In this manner, an input sequence provided to the mobile device in an automated manner may emulate user interactions with the monitored mobile device. After the providing of the one or more input actions to the monitored mobile device, the routine proceeds to block 418 to determine if the entire received defined input sequence has been provided to the monitored mobile device. If not, the routine returns to block 416 to provide additional input actions included in the received input sequence to the monitored mobile device in accordance with the parameters and actions defined within the received input sequence. If it is determined that the received defined input sequence has been provided to the monitored mobile device, the routine proceeds to block 420.

If it was determined in block 410 that the received indication of one or more input actions for the monitored mobile device are the result of interactive user input (such as via a GUI or command-line interface provided by the CIC system or associated Mobile Device Testing Service), the routine proceeds to block 424 to determine if a defined input sequence is currently in progress—that is, whether the CIC system has earlier received an indication of a defined input sequence which has not yet been completely provided to the monitored mobile device. If a defined input sequence is currently in progress, the routine proceeds to block 426 to determine whether to abort the providing of that defined input sequence to the monitored mobile device. For example, in certain embodiments and configurations, the CIC system may have previously determined (such as based on one or more configuration parameters provided by one or more users of the CIC system) to assign interactive user input actions a higher priority than defined input sequences, and may therefore determine in block 426 that the defined input sequence currently in progress should be aborted.

If it is determined that the defined input sequence currently in progress should be aborted, the routine proceeds to block 430 and aborts the providing of the defined testing sequence to the monitored mobile device, either permanently or in a manner that allows the CIC system to defer and/or reschedule the providing of some or all of the input actions included in the defined input sequence to the monitored mobile device. The routine then proceeds to block 432 to optionally initiate an interactive testing mode of the CIC system in a manner similar to that described above with respect to block 406. For example, in certain embodiments and configurations, the determination in block 426 to cancel the existing defined input sequence may indicate that it is also appropriate to prevent the initiating of any additional defined input sequences, either for a predefined period of time, until particular configuration information is received from one or more users of the CIC system, or until some other appropriate time. The routine then proceeds to block 434, in which the received interactive user input action is provided to the monitored mobile device.

If it was determined in block 426 not to cancel the defined input sequence, the routine proceeds to block 428 to optionally provide the received interactive input action to the monitored mobile device. As described above, for example, if in block 414 it was determined to initiate an input sequence testing mode after receiving the defined input sequence currently being provided to the monitored mobile device, the received interactive user input action may be ignored or deferred until the defined input sequence in progress has been completely provided to the monitored mobile device. In certain embodiments, the CIC system may use one or more buffers to queue one or more interactive input actions deferred in this manner for providing those interactive input actions to the monitored mobile device at a later time. As another example, the routine in block 428 may determine to provide the received interactive user input action to the monitored mobile device as part of the defined input sequence is still being provided to the monitored mobile device, either interleaved with input actions included in the defined input sequence, concurrently with one or more input actions of the defined input sequence, or in some other manner. After block 428, the routine proceeds to block 418 to determine whether the entire defined input sequence has been provided to the monitored mobile device.

If it was determined in block 418 that the received defined input sequences been provided to the monitored mobile device, or if the received interactive input action was provided to the monitored mobile device in block 434, the routine proceeds to block 420 to determine whether the capture of data from the monitored mobile device shall continue, such as until an explicit indication to terminate, or indication that the monitored mobile device has been or shall be uncoupled from the corresponding MDCI, is received. If it is determined to continue, the routine returns to block 406 to optionally initiate an interactive testing mode for the monitored mobile device, and then to block 408 to await additional input actions to be provided to the monitored mobile device. Otherwise, the routine proceeds to block 499 and ends.

Modifications

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above. For instance, one or more components or modules described above as being part of the described mobile device communications interface (MDCI) may instead be provided as part of the communications interface controller (CIC) or vice versa, and in some embodiments may be modified or eliminated. In certain embodiments, additional components, modules or functionality may be provided as part of other components or modules described above The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. In addition, while various operations may be illustrated as being performed in a particular manner (e.g., in serial or in parallel) and/or in a particular order, those skilled in the art will appreciate that in other embodiments the operations may be performed in other orders and in other manners. Some of the method or algorithms may be implemented in software routines. Some of the software routines may be called from other software routines. Software routines may execute sequentially or concurrently, and may employ a multi-threaded approach.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
 a communications interface having a plurality of output channels and a plurality of additional channels, the plurality of additional channels including a plurality of I/O channels that correspond to a SIM interface of the mobile device;
 a controller communicatively coupled to the communications interface via at least a first of the plurality of output channels and one or more of the plurality of additional channels and which:
 captures, via the first output channel, video data of a display of a mobile device at a capture frame rate that is equal to or greater than a frame rate of the display and at a capture resolution that is equal to or greater than a resolution of the display,
 selectively provides, to the mobile device, access to at least one of a plurality of SIM interface cards via one or more of the plurality of I/O channels of the communications interface; and
 provides to the mobile device, via the plurality of additional channels and during the capture of the video data via the first output channel, an indication of each of a plurality of input actions, the indicated plurality of input actions corresponding to one or more of a plurality of input capabilities of the mobile device; and one or more storage devices communicatively coupled to the controller and which store at least a portion of the captured video data.

2. The system of claim 1 wherein the plurality of output channels of the communications interface include at least one audio output channel, wherein the controller is further communicatively coupled to the communications interface via the at least one audio output channel and captures audio data of the mobile device via the at least one audio output channel, and wherein the one or more storage devices store at least a portion of the captured audio data.

3. The system of claim 1 wherein the plurality of additional channels of the communications interface include at least one of:

one or more audio input channels corresponding to one or more audio input capabilities of the mobile device;

one or more control input channels corresponding to one or more hardware controls of the mobile device; and one or more touchscreen input channels corresponding to a touchscreen of the mobile device.

4. The system of claim 1 wherein the mobile device includes a data port to communicatively interface with one or more computing systems, wherein the plurality of additional channels of the communications interface includes one or more I/O channels corresponding to the data port of the mobile device, wherein the providing of the indicated plurality of input actions includes providing input data to the mobile device via the one or more I/O channels corresponding to the data port of the mobile device, and wherein the controller captures at least a portion of output data from the mobile device via the one or more I/O channels corresponding to the data port of the mobile device.

5. The system of claim 1 wherein the controller is communicatively coupled to a plurality of SIM interface cards, and wherein selectively providing the mobile device with access to the at least one SIM interface card via the one or more of the plurality of I/O channels of the communications interface includes selectively multiplexing the plurality of the SIM interface cards.

6. The system of claim 1 wherein the system further comprises one or more components for providing a graphical user interface for use by one or more users, and wherein at least one of the indicated input actions is based at least in part on a received indication of one or more interactions of a first user with one or more graphical controls of the graphical user interface.

7. The system of claim 6 wherein the graphical user interface includes one or more graphical controls representing a touchscreen of the mobile device, and wherein the at least one indicated input action corresponds to one or more user interactions with the mobile device touchscreen.

8. The system of claim 7 wherein the one or more user interactions with the mobile device touchscreen include a finger swipe between two or more distinct areas of the mobile device touchscreen.

9. The system of claim 7 wherein the one or more user interactions with the mobile device touchscreen include and interaction of two or more fingers with the mobile device touchscreen.

10. The system of claim 1 wherein at least one of the indicated plurality of input actions is provided based at least in part on a communication received from a user.

11. The system of claim 1 wherein the system further comprises one or more components for providing a programmatic interface for use by one or more users, and wherein the indicated plurality of input actions includes a predetermined sequence of input actions that is based at least in part on input received from a first user via the provided programmatic interface.

12. The system of claim 1 wherein the system further comprises one or more components for providing a graphical user interface for use by one or more users, and wherein the indicated plurality of input actions includes a predetermined sequence of input actions that is based at least in part on a first sequence of interactions by a first user with one or more controls of the provided graphical user interface.

13. The system of claim 12 wherein the provided graphical user interface enables a user to store sequences of user interactions with the one or more controls of the graphical user interface, wherein the first user stores the first sequence of interactions at a first time, and wherein the predetermined sequence of input actions is based at least in part on receiving, at a second time that is later than the first time, an indication of the stored first sequence of interactions.

14. The system of claim 1 wherein the communications interface is located at a first geographical location and wherein the controller is located at a distinct second geographical location.

15. The system of claim 14 wherein the indicated plurality of input actions is provided based at least in part on one or more communications received from a user that is located at a third geographical location distinct from the first and second geographical locations.

16. The system of claim 1 wherein the communications interface is located at a first geographical location, and wherein the indicated plurality of input actions is provided based at least in part on one or more communications received from a first remote user via one or more intermediate networks, the first remote user being located at a distinct second geographical location.

17. The system of claim 16 further comprising one or more components that provide at least a portion of the captured video data of the mobile device display to one or more additional remote users via the one or more intermediate networks, each of the one or more additional remote users being located at one or more additional geographical locations that are distinct from the first geographical location and the second geographical location.

18. The system of claim 1 further comprising a second communications interface communicatively coupled to the controller, and wherein the controller:

captures, via a first output channel of the second communications interface, second video data of a display of a second mobile device, the second video data having a second capture frame rate that is equal to or greater than a frame rate of the second mobile device display and having a second capture resolution that is equal to or greater than a resolution of the second mobile device display, and provides to the second mobile device, via one or more additional channels of the second communications interface and during the capture of the second video data, an indication of each of one or more second input actions.

19. The system of claim 1 wherein the video data of the mobile device display has a first format that is specific to the mobile device, and wherein the system further transcodes the captured video data to a distinct second format.

20. The system of claim 1 wherein the providing of the indicated plurality of input actions includes initiating one or more changes to an operating system of the mobile device.

21. A method for interacting with a mobile device, comprising:

capturing, by one or more processors via a display channel of a communications interface, video data of a first display of a mobile device, wherein the first display has a first frame rate and a first resolution, and wherein the captured video data has a second frame rate that is at least the first frame rate and a second resolution that is at least the first resolution;

selectively providing to the mobile device, by the one or more processors and via one or more of a plurality of distinct input channels of the communications interface, access to at least one of a plurality of SIM interface cards; and providing to the mobile device, by the one or more processors and via the plurality of distinct input channels, indications of a plurality of input actions, the indications of at least some of the input actions being provided during the capturing of the video data.

22. The method of claim 21 further comprising:
providing a graphical user interface for use by one or more users, wherein at least one of the plurality of input actions is based at least in part on one or more interactions of a first user with one or more graphical controls of the graphical user interface.

23. The method of claim 22 wherein providing a graphical user interface includes providing a first control representing a touchscreen of the mobile device, and wherein the at least one input action corresponds to one or more user interactions with the mobile device touchscreen.

24. The method of claim 22 wherein providing the indicated plurality of input actions includes providing a predetermined sequence of input actions that is based at least in part on a first sequence of interactions by the first user with the one or more controls of the graphical user interface.

25. The method of claim 24 wherein providing the graphical user interface enables the one or more users to store sequences of user interactions with the one or more controls of the graphical user interface, wherein the first user stores the first sequence of interactions at a first time, and wherein the indications of the predetermined sequence of input actions are based at least in part on receiving an indication of the stored first sequence of interactions at a second time that is later than the first time.

26. The method of 21 further comprising:
providing a programmatic interface for use by one or more users.

27. The method of 26 wherein providing the indicated plurality of input actions includes providing a predetermined sequence of input actions that is based at least in part on input received from a first user via the provided programmatic interface.

28. The method of 26 wherein providing the indicated plurality of input actions includes providing at least one input action that is based at least in part on input interactively provided by a first user via the provided programmatic interface.

29. The method of claim 21 wherein the communications interface and the mobile device are located at a first geographical location, and wherein the providing of the indicated plurality of input actions is based at least in part on one or more communications received from a first remote user, the first remote user being located at a distinct second geographical location.

30. The method of claim 21 wherein the communications interface and the mobile device are located at a first geographical location, and wherein the method further comprises providing at least a portion of the captured video data to one or more remote users via one or more intermediate networks, each of the one or more remote users being located at one or more second geographical locations distinct from the first geographical location.

31. A system, comprising:
a communications interface having a first channel and having a plurality of distinct second channels, the plurality of second channels including a plurality of I/O channels corresponding to a SIM interface of a mobile device;
a controller communicatively coupled to the communications interface and which:
captures, via the first channel of the communications interface, video data of a first display of the mobile device at a capture frame rate that is equal to or greater than a frame rate of the first display and at a capture resolution that is equal to or greater than a resolution of the first display; and
selectively provides, via one or more of the plurality of I/O channels corresponding to the SIM interface, the mobile device with access to at least one of a plurality of SIM interface cards;
wherein the controller is responsive to one or more communications received from a client device to:
operate in a first mode that includes providing to the mobile device, via the plurality of distinct second channels of the communications interface and during the capture of the video data, indications of a plurality of predefined input actions to the mobile device, or
operate in a second mode that includes providing to the mobile device, via the plurality of second channels and during the capture of the video data, indications of a plurality of interactive input actions from a user.

32. The system of claim 31 further comprising a storage device communicatively coupled to the controller and which stores at least some of the captured video data.

33. The system of claim 31 wherein the one or more received communications include one of a request to initiate operating in the first mode and a request to initiate operating in the second mode.

34. The system of claim 31 wherein the first mode further includes:
determining whether the one or more received communications includes an indication of an interactive input action from a user of the client device; and
if it is determined that the one or more received communications includes an indication of an interactive input action, causing the controller to operate in the second mode.

35. The system of claim 31 wherein the plurality of second channels of the communications interface include at least one audio output channel, and wherein the controller captures audio data of the mobile device via the at least one audio output channel.

36. The system of claim 31 wherein the plurality of second channels of the communications interface includes at least one of:
one or more audio input channels corresponding to one or more audio input capabilities of the mobile device;
one or more control input channels corresponding to one or more hardware controls of the mobile device; and
one or more touchscreen input channels corresponding to a touchscreen of the mobile device.

37. The system of claim 31 wherein the controller is communicatively coupled to the plurality of SIM interface cards, and wherein selectively providing the mobile device with access to at least one SIM interface card via the one or more of the plurality of I/O channels corresponding to the SIM interface includes selectively multiplexing the multiple SIM interface cards.

38. The system of claim 31 wherein the system further comprises one or more components that provide a graphical user interface for use by one or more users of one or more client devices, and wherein the indications of the interactive input actions are based at least in part on a plurality of interactions of a first user with one or more graphical controls of the provided graphical user interface.

39. The system of claim 31 wherein the system further comprises one or more components that provide a graphical user interface for use by one or more users of one or more client devices, and wherein the indications of the predefined input actions are based at least in part on at least one sequence of multiple interactions of a first user with one or more graphical controls of the provided graphical user interface.

40. The system of claim 31 wherein the system further comprises one or more components that provide a programmatic interface for use by one or more users of one or more client devices, and wherein the indications of the interactive input actions are based at least in part on one or more communications received from a first user of a first client device via the provided programmatic interface.

41. The system of claim 31 wherein the system further comprises one or more components that provide a programmatic interface for use by one or more users of one or more client devices, and wherein the indications of the predefined input actions are based at least in part on at least one sequence of multiple input actions specified via the provided programmatic interface.

42. A method, comprising:
  capturing, by at least one processor via a first channel of a communications interface, video data of a display of a mobile device at a capture frame rate that is equal to or greater than a frame rate of the display and at a capture resolution that is equal to or greater than a resolution of the display;
  selectively providing to the mobile device, by the at least one processor and via one or more of a plurality of distinct second channels of the communications interface, access to at least one of a plurality of SIM interface cards to enable the mobile device to communicatively interact with one or more mobile data services;
  initiating, by the at least one processor, a first operating mode for a controller communicatively coupled to the communications interface, the first operating mode including providing to the mobile device indications of a plurality of predetermined input actions via the plurality of distinct second channels of the communications interface, wherein the providing of at least some of the indicated predetermined input actions is performed during the capturing of the video data;
  receiving, by the at least one processor, one or more client communications; and
  responsive to the receiving of the one or more client communications, initiating, by the at least one processor, a second operating mode for the controller, the second operating mode including providing to the mobile device indications of a plurality of interactive user input actions via the plurality of second channels, wherein the providing of at least some of the indicated interactive user input actions is performed during the capturing of the video data.

43. The method of claim 42 wherein receiving the one or more client communications includes receiving a request to initiate the second operating mode.

44. The method of claim 42 wherein receiving the one or more client communications includes receiving an indication of at least one of the plurality of interactive user input actions.

45. The method of claim 42 further comprising:
  receiving, by the at least one processor and after the initiating of the second operating mode, one or more additional client communications; and
  responsive to the receiving of the one or more additional client communications, initiating the first operating mode.

* * * * *

UNITED STATES PATENT AND TRADEMARK OFFICE
CERTIFICATE OF CORRECTION

| | | |
|---|---|---|
| PATENT NO. | : 9,161,238 B2 | Page 1 of 1 |
| APPLICATION NO. | : 13/785957 | |
| DATED | : October 13, 2015 | |
| INVENTOR(S) | : David K. Reed et al. | |

It is certified that error appears in the above-identified patent and that said Letters Patent is hereby corrected as shown below:

In the claims

Column 27, Lines 59-61:
"interactions with the mobile device touchscreen include and interaction of two or more fingers with the mobile device touchscreen." should read, --interactions with the mobile device touchscreen include an interaction of two or more fingers with the mobile device touchscreen.--.

Column 29, Line 44:
"26. The method of 21" should read, --26. The method of claim 21--.

Column 29, Line 46:
"27. The method of 26" should read, --27. The method of claim 26--.

Column 29, Line 51:
"28. The method of 26" should read, --28. The method of claim 26--.

Signed and Sealed this
Twelfth Day of April, 2016

Michelle K. Lee
*Director of the United States Patent and Trademark Office*